US010278179B2

(12) United States Patent
Amini et al.

(10) Patent No.: US 10,278,179 B2
(45) Date of Patent: Apr. 30, 2019

(54) DEDICATED BACKHAUL LINK FOR A ROBUST WIRELESS MESH NETWORK

(71) Applicant: NETGEAR, INC., San Jose, CA (US)

(72) Inventors: Peiman Amini, Mountain View, CA (US); Joseph Amalan Arul Emmanuel, Cupertino, CA (US)

(73) Assignee: NETGEAR, INC., San Jose, CA (US)

( * ) Notice: Subject to any disclaimer, the term of this patent is extended or adjusted under 35 U.S.C. 154(b) by 145 days.

(21) Appl. No.: 15/287,711

(22) Filed: Oct. 6, 2016

(65) Prior Publication Data

US 2017/0135022 A1 May 11, 2017

Related U.S. Application Data

(60) Provisional application No. 62/253,540, filed on Nov. 10, 2015, provisional application No. 62/336,503, filed on May 13, 2016.

(51) Int. Cl.
*H04W 72/04* (2009.01)
*H04L 12/44* (2006.01)
*H04L 12/26* (2006.01)
*H04L 12/733* (2013.01)
*H04W 4/02* (2018.01)
(Continued)

(52) U.S. Cl.
CPC ......... *H04W 72/0453* (2013.01); *H04L 12/44* (2013.01); *H04L 43/0888* (2013.01); *H04L 43/0894* (2013.01); *H04L 43/10* (2013.01); *H04L 43/16* (2013.01); *H04L 45/20* (2013.01); *H04W 4/023* (2013.01); *H04W 24/06* (2013.01); *H04W 24/08* (2013.01); *H04W 36/30* (2013.01); *H04W 36/36* (2013.01);

*H04W 40/12* (2013.01); *H04W 76/15* (2018.02); *H04W 24/04* (2013.01); *H04W 72/085* (2013.01);
(Continued)

(58) Field of Classification Search
CPC . H04L 12/44; H04L 43/0888; H04L 43/0894; H04L 43/10; H04L 43/16; H04L 45/20; H04W 24/04; H04W 24/06; H04W 24/08; H04W 36/30; H04W 36/36; H04W 40/12; H04W 4/023; H04W 72/0453; H04W 72/085; H04W 76/10; H04W 76/15; H04W 84/12; H04W 84/18
See application file for complete search history.

(56) References Cited

U.S. PATENT DOCUMENTS 7,155,167 B1 12/2006 Carty
7,502,354 B1 3/2009 Maufer
(Continued)

OTHER PUBLICATIONS

"WLAN High Availability", Technical white paper; Hewlett-Packard Development Company, L.P., Oct. 2014, 8 pages.

*Primary Examiner* — Kan Yuen
(74) *Attorney, Agent, or Firm* — Perkins Coie LLP

(57) ABSTRACT

Introduced here are techniques to provide automated mesh point survey and guided installation for assisting the installation and configuration of a wireless mesh network. Additional implementation techniques are also introduced including, for example, link rate estimation, roaming, and dedicated backhaul link implementation in such wireless mesh network, are also discussed. Among other benefits, this disclosure provides an integral solution where multiple wireless local area network (WLAN) mesh point devices are deployed in a relatively large environment with potential dead spots, such as a home or an office.

19 Claims, 61 Drawing Sheets

(51) Int. Cl.
*H04W 24/08* (2009.01)
*H04W 36/30* (2009.01)
*H04W 36/36* (2009.01)
*H04W 24/06* (2009.01)
*H04W 40/12* (2009.01)
*H04W 76/15* (2018.01)
*H04W 84/18* (2009.01)
*H04W 84/12* (2009.01)
*H04W 24/04* (2009.01)
*H04W 72/08* (2009.01)
*H04W 76/10* (2018.01)

(52) U.S. Cl.
CPC ............ *H04W 76/10* (2018.02); *H04W 84/12* (2013.01); *H04W 84/18* (2013.01)

(56) References Cited

U.S. PATENT DOCUMENTS

| | | | |
|---|---|---|---|
| 7,567,822 | B2 | 7/2009 | Hart et al. |
| 8,248,948 | B2 | 8/2012 | Weil et al. |
| 9,001,767 | B1* | 4/2015 | Gatewood ............ H04W 72/04 370/328 |
| 9,179,495 | B1 | 11/2015 | Scherzer et al. |
| 9,467,929 | B2 | 10/2016 | Sekine |
| 9,832,796 | B2 | 11/2017 | Mehta |
| 9,942,709 | B2 | 4/2018 | Sung |
| 2002/0042274 | A1 | 4/2002 | Ades |
| 2005/0048963 | A1 | 3/2005 | Kubler et al. |
| 2007/0206528 | A1 | 9/2007 | Walton et al. |
| 2007/0280453 | A1 | 12/2007 | Kelley et al. |
| 2008/0025208 | A1 | 1/2008 | Chan |
| 2008/0080414 | A1* | 4/2008 | Thubert ................ H04W 76/12 370/328 |
| 2008/0247317 | A1 | 10/2008 | Weil et al. |
| 2009/0046655 | A1 | 2/2009 | Zhao et al. |
| 2009/0067369 | A1 | 3/2009 | Stamoulis et al. |
| 2009/0116407 | A1 | 5/2009 | Ishii |
| 2009/0135738 | A1 | 5/2009 | Mhatre et al. |
| 2009/0135794 | A1 | 5/2009 | Su et al. |
| 2009/0221238 | A1 | 9/2009 | Ko et al. |
| 2009/0252127 | A1 | 10/2009 | Rangarajan et al. |
| 2010/0118830 | A1 | 5/2010 | Stephenson et al. |
| 2010/0157888 | A1 | 6/2010 | Aggarwal et al. |
| 2010/0231473 | A1 | 9/2010 | Shtrom et al. |
| 2010/0246416 | A1 | 9/2010 | Sinha et al. |
| 2010/0260146 | A1* | 10/2010 | Lu ....................... H04L 12/4633 370/331 |
| 2010/0291931 | A1 | 11/2010 | Suemitsu et al. |
| 2011/0081903 | A1 | 4/2011 | Cai et al. |
| 2011/0250926 | A1 | 10/2011 | Wietfeldt et al. |
| 2011/0286404 | A1 | 11/2011 | Abraham et al. |
| 2011/0299422 | A1 | 12/2011 | Kim et al. |
| 2012/0020319 | A1 | 1/2012 | Song et al. |
| 2012/0129517 | A1 | 5/2012 | Fox et al. |
| 2012/0224481 | A1 | 9/2012 | Babiarz et al. |
| 2012/0224484 | A1 | 9/2012 | Babiarz et al. |
| 2012/0225646 | A1 | 9/2012 | Mochida et al. |
| 2012/0294200 | A1 | 11/2012 | Wang et al. |
| 2013/0194948 | A1 | 8/2013 | Mallik et al. |
| 2014/0233412 | A1 | 8/2014 | Mishra et al. |
| 2014/0254400 | A1 | 9/2014 | Zhou et al. |
| 2014/0270306 | A1 | 9/2014 | Luna et al. |
| 2015/0018028 | A1 | 1/2015 | Uplenchwar et al. |
| 2015/0029067 | A1 | 1/2015 | Donaldson et al. |
| 2015/0049616 | A1 | 2/2015 | Cowan et al. |
| 2015/0092681 | A1 | 4/2015 | Fernando et al. |
| 2015/0103685 | A1 | 4/2015 | Butchko et al. |
| 2015/0215791 | A1 | 7/2015 | Geller et al. |
| 2015/0264614 | A1 | 9/2015 | Stager et al. |
| 2015/0334750 | A1 | 11/2015 | Mehta |
| 2016/0007273 | A1 | 1/2016 | Pang et al. |
| 2016/0029384 | A1 | 1/2016 | Sidhu et al. |
| 2016/0066249 | A1 | 3/2016 | Dukes et al. |
| 2016/0094946 | A1 | 3/2016 | Keithley |
| 2016/0142163 | A1 | 5/2016 | Sirotkin |
| 2016/0192203 | A1* | 6/2016 | Gokturk ............. H04L 41/0823 370/254 |
| 2016/0212755 | A1* | 7/2016 | Cao ..................... H04W 40/12 |
| 2016/0227544 | A1 | 8/2016 | Katar et al. |
| 2016/0269097 | A1 | 9/2016 | Islam et al. |
| 2016/0286374 | A1 | 9/2016 | Patil et al. |
| 2016/0308755 | A1 | 10/2016 | Garg |
| 2016/0366632 | A1 | 12/2016 | Cui et al. |
| 2017/0006431 | A1 | 1/2017 | Donovan et al. |
| 2017/0048913 | A1 | 2/2017 | Teyeb et al. |
| 2017/0070919 | A1 | 3/2017 | Chandok et al. |
| 2017/0118705 | A1 | 4/2017 | Tran et al. |
| 2017/0125920 | A1 | 5/2017 | Spiel et al. |
| 2017/0127295 | A1 | 5/2017 | Black et al. |
| 2017/0127325 | A1 | 5/2017 | Vikberg et al. |
| 2017/0164260 | A1 | 6/2017 | Shi et al. |
| 2017/0164323 | A1 | 6/2017 | Markhovsky et al. |
| 2017/0215091 | A1 | 7/2017 | Ling |
| 2017/0238189 | A1* | 8/2017 | Nolan ................... H04W 16/14 370/328 |
| 2017/0251410 | A1 | 8/2017 | Comstock |
| 2017/0325243 | A1 | 11/2017 | Yasukawa et al. |

* cited by examiner

Lorem ipsum dolor sit amet, consectetur adipiscing elit. Suspendisse tincidunt dign

1. Install the Base Orbi

2. Install the other Orbis

3. Test your new Wifi!

1. Install the Base Orbi

Lorem ipsum dolor sit amet, consectetur
adipiscing elit. Suspendisse tincidunt dign Hang tight...

Connecting to Orbi network

Setup: connect to Base

Change SSID / password

Preset SSID Conflicts

You Rock!

You are now connected to the base

Connect to your secure Wifi

Let's connect to your secure wifi

1. Go to your iOS Settings

2. Select your Network

Smith-Wifi

3. Use your password

MyPassword123
Copy Password

4. Come back to the App

Orbi Installed!

Looks like your current internet speed is
80mbit/s. We looks like you can get
30mbit/s coverage for your whole home!

Learn out about the process.

Your Wifi

Username
Smith-Wifi

Password
MyPassword123

Edit Information

Your Netgear Credentials

Username
MyAdmin

Password
MyNewPassword

Share Info

Installing Orbi Pt.2

The second step when installing is to make sure the orbi is in the right spot. You'll see one of these confirmation screens:

Great Work!

Lorem ipsum dolor sit amet, constempor egpulvinar posuere ex, a ultrices ni.Lorem

Too Far...

Lorem ipsum dolor sit amet, constempor egpulvinar posuere ex, a ultrices ni.Lorem

Too Close...

Lorem ipsum dolor sit amet, constempor egpulvinar posuere ex, a ultrices ni.Lorem Testing Wifi >

FIG. 4B

Not your first rodeo with orbi? Skip

Wifi Testing

Lorem ipsum dolor sit amet, constempor egpulvinar posuere ex, a ultrices ni:

Bad Wifi — Lorem ipsum dolor sit amet, constempor egpulvinar

OK Wifi — Lorem ipsum dolor sit amet, constempor egpulvinar

Great Wifi — Lorem ipsum dolor sit amet, constempor egpulvinar

Check out the interface »

Almost Ready to Install!

Orbi works best if you know where you have bad wifi in your house. We reccomend that you survey your house first. Your base Orbi may have extended your previous signal.

If you have a good idea of where you're having bad wifi, you can get to installing right away.

Skip Wifi Survey

You have great wifi here!

Run Speed Test

Install the next extension after
you check out your coverage

You have ok wifi here!

Run Speed Test

Install the next extension after
you check out your coverage

You have bad wifi here!

Run Speed Test

Install the next extension after you check out your coverage

2. Install the Orbis

Grab your first Orbi

I need help

You're too close to the Base!
Move farther away from it.

You're still a little too close to the Base! Keep moving farther away from it to get the best configuration.

Find the closest outlet to install!

Bill and the Base will be the perfect distance if you plug him in now!

You're little too far from the Base! Move closer to him to get the best configuration.

You're too far from the Base!
Move closer to him.

Great Work!

Your Orbi and the Base Orbi are talking to each other. Next let's see how well they work together The Orbi might be
a little too far.

Your signal could be faster, but Bill
is still extending the wifi.
Try moving Bill closer to the Base!

No thanks

The Orbi might be
a little too close.

Your signal could be extended
farther. Try moving Bill farther away.

No thanks

Great Work!

You moved the Orbi in to a better spot. You rock.

Now, let's make sure you've eliminated that dead spot.

Moving Orbi

Unplug the Orbi and plug it into the next closest outlet let us know when he's plugged back in.

Uh Oh!

This spot isn't as good as we thought! In fact, it's worse than the first spot. Let's move it back to the first location and keep moving forward!

Let's 2X the Orbi to
improve the speed

Grab another Orbi and
move to the last installed
Orbi

I need help

| Phone | Device type |
|---|---|
| Apple iPhone 5S | 11n 1x1 |
| Apple iPhone 6 | 11ac 1x1 |
| Apple iPhone 6S | 11ac 2x2 |
| Samsung Galaxy S4 | 11n 1x1 |
| Samsung Galaxy S5 LTE-A | 11ac 2x2 |
| Samsung Galaxy S6 | 11ac 2x2 |
| Apple iPad Air 2 | 11ac 2x2 |

FIG. 12

| Channel | Lower Frequency | Center Frequency | Upper Frequency |
|---|---|---|---|
| 1 | 2.401 | 2.412 | 2.423 |
| 2 | 2.406 | 2.417 | 2.428 |
| 3 | 2.411 | 2.422 | 2.433 |
| 4 | 2.416 | 2.427 | 2.438 |
| 5 | 2.421 | 2.432 | 2.443 |
| 6 | 2.426 | 2.437 | 2.448 |
| 7 | 2.431 | 2.442 | 2.453 |
| 8 | 2.436 | 2.447 | 2.458 |
| 9 | 2.441 | 2.452 | 2.463 |
| 10 | 2.451 | 2.457 | 2.468 |
| 11 | 2.451 | 2.462 | 2.473 |

FIG. 13A

| CHANNEL NUMBER | FREQUENCY MHZ | NORTH AMERICA (FCC) |
|---|---|---|
| 36 | 5180 | ✓ |
| 40 | 5200 | ✓ |
| 44 | 5220 | ✓ |
| 48 | 5240 | ✓ |
| 52 | 5260 | DFS |
| 56 | 5280 | DFS |
| 60 | 5300 | DFS |
| 64 | 5320 | DFS |
| 100 | 5500 | DFS |
| 104 | 5520 | DFS |
| 108 | 5540 | DFS |
| 112 | 5560 | DFS |
| 116 | 5580 | DFS |
| 120 | 5600 | No Access |
| 124 | 5620 | No Access |
| 128 | 5640 | No Access |
| 132 | 5660 | DFS |
| 136 | 5680 | DFS |
| 140 | 5700 | DFS |
| 149 | 5745 | ✓ |
| 153 | 5765 | ✓ |
| 157 | 5785 | ✓ |
| 161 | 5805 | ✓ |
| 165 | 5825 | ✓ |

FIG. 13B

5G 80MHz 2x2 Rates

| MCS | Modulation | NSS | LGI PHY rate(Mbps) |
|---|---|---|---|
| 0 | BPSK | 2 | 58.5 |
| 1 | QPSK | 2 | 117 |
| 2 | QPSK | 2 | 175.5 |
| 3 | 16-QAM | 2 | 234 |
| 4 | 16-QAM | 2 | 351 |
| 5 | 64-QAM | 2 | 468 |
| 6 | 64-QAM | 2 | 526.5 |
| 7 | 64-QAM | 2 | 585 |
| 8 | 256-QAM | 2 | 702 |
| 9 | 256-QAM | 2 | 780 |

FIG. 15A 5G 80MHz 1x1 Rates

| MCS | Modulation | NSS | LGI PHY rate(Mbps) |
|---|---|---|---|
| 0 | BPSK | 1 | 29.3 |
| 1 | QPSK | 1 | 58.5 |
| 2 | QPSK | 1 | 87.8 |
| 3 | 16-QAM | 1 | 117 |
| 4 | 16-QAM | 1 | 175.5 |
| 5 | 64-QAM | 1 | 234.0 |
| 6 | 64-QAM | 1 | 263.3 |
| 7 | 64-QAM | 1 | 292.5 |
| 8 | 256-QAM | 1 | 351.5 |
| 9 | 256-QAM | 1 | 390.0 |

FIG. 15B

2.4G 20MHz 2x2 Rates

| MCS | Modulation | NSS | LGI PHY rate(Mbps) |
|-----|------------|-----|--------------------|
| 0 | BPSK | 2 | 13 |
| 1 | QPSK | 2 | 26 |
| 2 | QPSK | 2 | 39 |
| 3 | 16-QAM | 2 | 52 |
| 4 | 16-QAM | 2 | 78 |
| 5 | 64-QAM | 2 | 104 |
| 6 | 64-QAM | 2 | 117 |
| 7 | 64-QAM | 2 | 130 |

FIG. 15C

2.4G 20MHz 1x1 Rates

| MCS | Modulation | NSS | LGI PHY rate(Mbps) |
|---|---|---|---|
| 0 | BPSK | 1 | 6.5 |
| 1 | QPSK | 1 | 13 |
| 2 | QPSK | 1 | 19.5 |
| 3 | 16-QAM | 1 | 26 |
| 4 | 16-QAM | 1 | 39 |
| 5 | 64-QAM | 1 | 52 |
| 6 | 64-QAM | 1 | 58.5 |
| 7 | 64-QAM | 1 | 65 |

FIG. 15D

| Instruction | TPUT (mbps) |
|---|---|
| Too close | > 180 |
| A bit close | 140-180 |
| Good | 120-140 |
| A bit far | 80-120 |
| Too far | < 80 |

Example Instruction Mapping for
Link-Orbi-5G

FIG. 16

| WLAN Coverage | TPUT (mbps) |
|---|---|
| Good | > 30 |
| Ok | 10-30 |
| Bad | < 10 |

FIG. 17A

| Device | 802.11v | 802.11k | 802.11r |
|---|---|---|---|
| iPhone 6s | Yes | Yes | Yes |
| iPhone 6s Plus | Yes | Yes | Yes |
| iPhone 6 | Yes | Yes | Yes |
| iPhone 6 Plus | Yes | Yes | Yes |
| iPhone 5s | Yes | Yes | Yes |
| iPhone 5c | Yes | Yes | Yes |
| iPad Air | Yes | Yes | Yes |
| iPad Air 2 | Yes | Yes | Yes |
| iPad Mini 3 | Yes | Yes | Yes |
| iPad Mini 2 Retina | Yes | Yes | Yes |

FIG. 18A

| Device | 802.11v | 802.11k | 802.11r |
|---|---|---|---|
| Galaxy s6 | No | Yes | Yes |
| Galaxy s5 | No | Yes | Yes |
| Galaxy s4 | No | Yes | Yes |
| HTC One | Yes | Yes | Yes |

FIG. 18B

DEDICATED BACKHAUL LINK FOR A ROBUST WIRELESS MESH NETWORK

CROSS-REFERENCE TO RELATED APPLICATIONS

This application is entitled to the benefit of and the right of priority to U.S. Provisional Patent Application No. 62/253,540, entitled "METHOD AND APPARATUS FOR WHOLE HOME WI-FI COVERAGE", filed Nov. 10, 2015; and to U.S. Provisional Patent Application No. 62/336,503, entitled "DEDICATED BACKHAUL FOR WHOLE HOME COVERAGE", filed May 13, 2016; all of which are hereby incorporated by reference in their entireties.

This application is related to co-pending U.S. patent application Ser. No. 15/287,678, entitled "AUTOMATED MESH POINT SURVEY AND GUIDED INSTALLATION FOR A WIRELESS MESH NETWORK", filed Oct. 6, 2016; U.S. patent application Ser. No. 15/287,704, entitled "RATE ESTIMATION IN A WIRELESS MESH NETWORK", filed Oct. 6, 2016; U.S. patent application Ser. No 15/287,706, entitled "ROAMING IN A WIRELESS MESH NETWORK", filed Oct. 6, 2016; and U.S. patent application Ser. No. 15/271,912, entitled "DEDICATED BACKHAUL FOR WHOLE HOME COVERAGE", filed Sep. 21, 2016; all of which are hereby incorporated by reference in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to electronic communications, and more specifically, to techniques for implementing a local area wireless mesh network.

BACKGROUND

In an indoor environment such as a large house or an office, a single access point (AP) often may not be able to cover the entire indoor area.

One straightforward attempt to solve the problem is to increase the transmission power. However, solely relying on increasing the transmission power on the AP would be a poor solution. In addition to regulatory bodies that limit the transmission power of the AP, it is typical that the wireless local area network (WLAN) communications link between an AP and a clients is highly asymmetrical, that is, the client's transmission power is usually lower than the AP's transmission power. The client's antenna efficiency conventionally is also lower than the AP. Moreover, a portable client (e.g., a mobile phone) often is hand held by a user, and because of the signal absorption and disruption by the human body, signals from such portable client may reach the AP at even lower powers. Yet, many commonly used WLAN protocols require each side of the link to receive an acknowledgement (ACK) for the packets that are transmitted (e.g., in a downlink direction). If one side of the WLAN link cannot receive from the other side of the link, no packet can be transmitted to the other side of the link.

Instead of one AP with high transmission power and high performance antennas, an attractive alternative is using a multitude of smaller APs that are deployed in the environment in a scattered, distributed manner. These smaller APs form a wireless mesh network, and therefore are also called "mesh points." When a client device establishes connection with one of the mesh points, the mesh points can forward the traffic to the mesh point that is connected to the gateway, which in turn communicates the traffic to the outside world (e.g., wide area network (WAN) and/or "the Internet"). However, there are also many challenges associated with implementing these wireless mesh networks, especially in a home environment where a layman user may be involved in installing and configuring these mesh points.

BRIEF DESCRIPTION OF THE DRAWINGS

The present embodiments are illustrated by way of example and are not intended to be limited by the figures of the accompanying drawings.

FIGS. 4A-4C are example user interfaces illustrating introductory processes for assisting a user in installing additional mesh points in the wireless mesh network.

FIG. 12 is an example list of type of devices.

FIG. 13A is a table illustrating the upper, center, and lower frequencies of different Wireless LAN (WLAN) channels in a typical 2.4 GHz frequency band.

FIG. 13B is a table illustrating example frequencies of different Wireless LAN (WLAN) channels available (e.g., in the United States) in a typical 5 GHz frequency band.

FIGS. 15A-15D are example tables of closest PHY rates that can be used for throughput estimation.

FIG. 16 is an example table for mapping between estimated link rate (throughput) and user instruction, for a mesh point operating in a particular frequency band.

FIG. 17A is an example table for mapping between estimated link rate (throughput) and wireless network coverage.

FIGS. 18A-18B are a list of known user devices with their capabilities to follow or otherwise coordinate with the mesh network in performing intelligent roaming.

Like reference numerals refer to corresponding parts throughout the figures and specification.

DETAILED DESCRIPTION

Figure 1A:
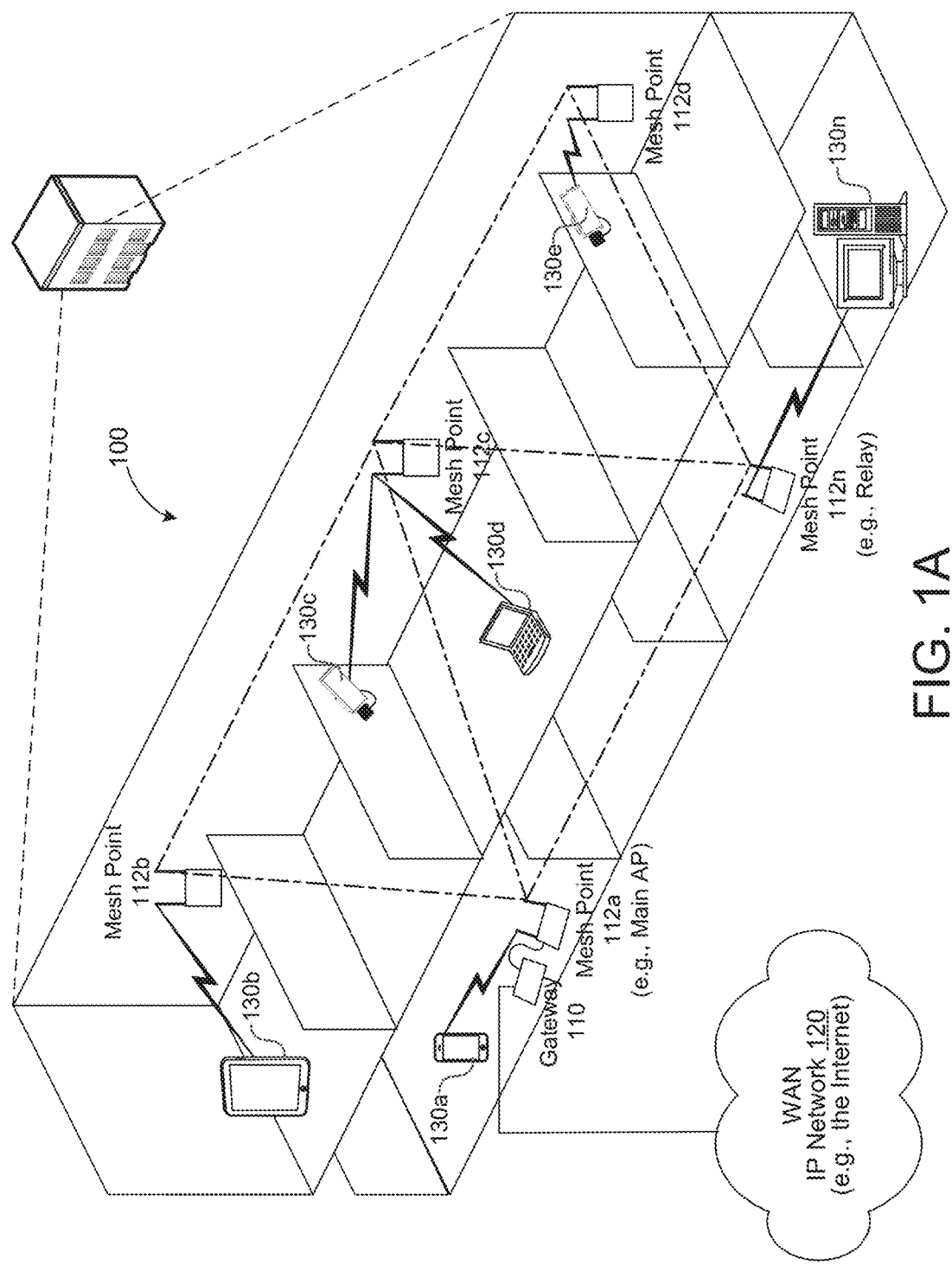
FIG. 1A is a representative wireless mesh network environment within which some embodiments may be implemented.

Generally speaking, as mentioned above, a better alternative to an access point (AP) with large transmission power is a wireless mesh network with a multitude of smaller APs, deployed in the environment in a scattered, distributed manner. These smaller APs (or mesh points) are often marketed as so-called "range extenders" or "repeaters." A range extender generally works by associating itself to a user's main AP and receiving Internet connection from the main AP. Then, clients such as mobile phones, laptops and desktop computers, and smart devices can associate to the range extender.

However, there are also many challenges associated with implementing wireless mesh networks with these range extenders, especially in a home environment where a layman user may be involved in installing and configuring these devices. One common problem with the installation process involving layman users is that users may not be able to install this mesh points in their best locations, for example, because the users do not know where to put each one of them to cover particular dead spots (i.e., locations with poor reception) in the house, how to find these dead spots, and so forth. In addition, many conventional range extenders are designed separately (and much like an afterthought) from the main AP, and therefore generally do not have much coordination with the main AP. In many of these conventional settings, it is up to the connection client to decide what happens (e.g., what action or reaction to take when a certain type of issues takes place, such as poor reception) in the wireless mesh network, which may adversely affect the efficiency and stability of such network. For example, roaming between the main AP and repeater can be a common issue where the clients may be stuck in connection with the main AP or a repeater mesh point and may not roam to the mesh point that can provide the clients with the best throughput. All too often, roaming between multiple range extenders and the main AP may not function as designed, and different roaming methods may be required for different types of clients. Other common issues include that the extender may not use the best band(s) to connect to the rest of the mesh network, or that the extender may not use the best band to forward the traffic when extender is connected to two or more bands on the main AP.

Introduced here, accordingly, are techniques to provide automated mesh point survey and guided installation for assisting the installation and configuration of a wireless mesh network. Additional implementation techniques are also introduced including, for example, rate estimation, roaming, and dedicated backhaul link implementation in such wireless mesh network, are also discussed. Among other benefits, this disclosure provides an integral solution where multiple wireless local area network (WLAN) mesh point devices are deployed in a relatively large environment with potential dead spots, such as a home or an office. As is introduced in more details below, one or more embodiments can aid the user in installation, can aid user to verify that installation is successful, and can aid user in upgrading an existing wireless mesh network. In some examples, the multiple device wireless mesh network may have a network control system, which may be centralized or distributed, and the network controller can decide, for example, with which mesh point each client should associate, when a client should roam, which topology the network should be using, with which band should the client associate, which band should be used for the traffic forwarding, and where to install a new mesh point to provide more coverage in the target area.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure.

The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication (e.g., a network) between components. The present embodiments are not to be construed as limited to specific examples described herein but rather to include within their scope all embodiments defined by the appended claims.

System Overview

FIG. 1A is a representative wireless mess network environment 100 within which some embodiments may be implemented. The environment 100 includes a gateway 110, a main mesh point 112a, a number of additional mesh points 112b-112n, a wide area network (WAN) 120, and a plurality of client devices 130a-130n.

The gateway 110 can be a default gateway, which in computer networking sense, is the node that is assumed to know how to forward packets on to other networks. In a home or small office environment, the gateway device 110, such as a digital subscriber line (DSL) router or cable router that connects the local area network (LAN) (e.g., the network established by mesh points 112a-112n) to the Internet (e.g., network 120) acts as the default gateway for all network devices. For example, the gateway 110 and the network 120 may be connected via a twisted pair cabling network, a coax cable network, a telephone network, or any suitable type of connection network. In some embodiments, the base station 110 and the network 120 may be connected wirelessly (e.g., which may include employing a data traffic network based on wireless telephony services such as 3G, 3.5G, 4G LTE and the like).

The main mesh point 112a, which is illustrated as operating in "main access point (AP)" mode, is coupled together with the network 120 so that main mesh point 112a can enable, either directly or through the additional mesh points 112b-112n, the client devices 130a-130n to exchange data to and from the network 120. The technologies supporting the communications between the gateway 110 and the main mesh point 112a may include Ethernet (e.g., as described in IEEE 802.3 family of standards) and/or other suitable types of area network technologies.

The additional mesh points 112b-112n connect to the main mesh point 112a, either directly or indirectly, via one or more wireless network communication technologies, such as WLAN (e.g., Wi-Fi), Bluetooth, etc. The IEEE 802.11 standards are a set of WLAN technology specifications commonly seen for implementing wireless local area network (WLAN) computer communication. Examples of different wireless communication protocols in the IEEE 802.11 family of standards can include IEEE 802.11a, IEEE 802.11b, IEEE 802.11n, IEEE 802.11ac, and so forth. When a client device (e.g., 130a, 130b, 130n) establishes connection with one of the mesh points 112b-112n, the mesh points 112b-112n can forward the traffic to the mesh point 112a that is connected to the gateway 110, which in turn communicates the traffic to the outside world (e.g., wide area network (WAN) 120 and/or "the Internet").

Although not shown for simplicity, the mesh points 112a-112n may include one or more processors, which may be general-purpose processors or may be application-specific integrated circuitry that provides arithmetic and control functions to implement the techniques disclosed herein on the mesh points 112a-112n. The processor(s) may include a cache memory (not shown for simplicity) as well as other memories (e.g., a main memory, and/or non-volatile memory such as a hard-disk drive or solid-state drive. In some examples, cache memory is implemented using SRAM, main memory is implemented using DRAM, and non-volatile memory is implemented using Flash memory or one or more magnetic disk drives. According to some embodiments, the memories may include one or more memory chips or modules, and the processor(s) on the mesh points 112a-112n may execute a plurality of instructions or program codes that are stored in its memory.

The client devices 130a-130n can connect to and communicate with the mesh points 112a-112n wirelessly including, for example, using the IEEE 802.11 family of standards (e.g., Wireless LAN), and can include any suitable intervening wireless network devices including, for example, base stations, routers, gateways, hubs, or the like. Depending on the embodiments, the network technology connecting between the client devices 130a-130n and the mesh points 112a-112n can include other suitable wireless standards such as the well-known Bluetooth communication protocols or near field communication (NFC) protocols. In some embodiments, the network technology between the devices 130a-130n and the mesh points 112a-112n can include a customized version of WLAN, Bluetooth, or customized versions of other suitable wireless technologies. Client devices 130a-130n can be any suitable computing or mobile devices including, for example, smartphones, tablet computers, laptops, personal digital assistants (PDAs), or the like. Client devices 130a-130n typically include a display, and may include suitable input devices (not shown for simplicity) such as a keyboard, a mouse, or a touchpad. In some embodiments, the display may be a touch-sensitive screen that includes input functionalities. Additional examples of the devices 130a-130n can include network-connected cameras (or "IP cameras"), home sensors, and other home appliances (e.g., a "smart refrigerator" that can connect to the Internet).

It is noted that one of ordinary skill in the art will understand that the components of FIG. 1 are just one implementation of the computer network environment within which present embodiments may be implemented, and the various alternative embodiments are within the scope of the present embodiments. For example, the environment 100 may further include intervening devices (e.g., switches, routers, hubs, etc.) among the mesh points 112a-112n, the network 120, and the client devices 130a-130n. In some examples, the network 120 comprises the Internet.

With the environment introduced above in mind, various techniques for implementing automated mesh point survey and guided installation are described in more detail below, with continued reference to the elements in FIG. 1. Also, for purposes of discussion herein, one or more devices in the plurality of mesh points 112a-112n, or the mesh network formed by the mesh points 112a-112n, may be referred to as Orbi™, which is a trademark of NETGEAR, Inc.

Device Architecture

Figure 1B:
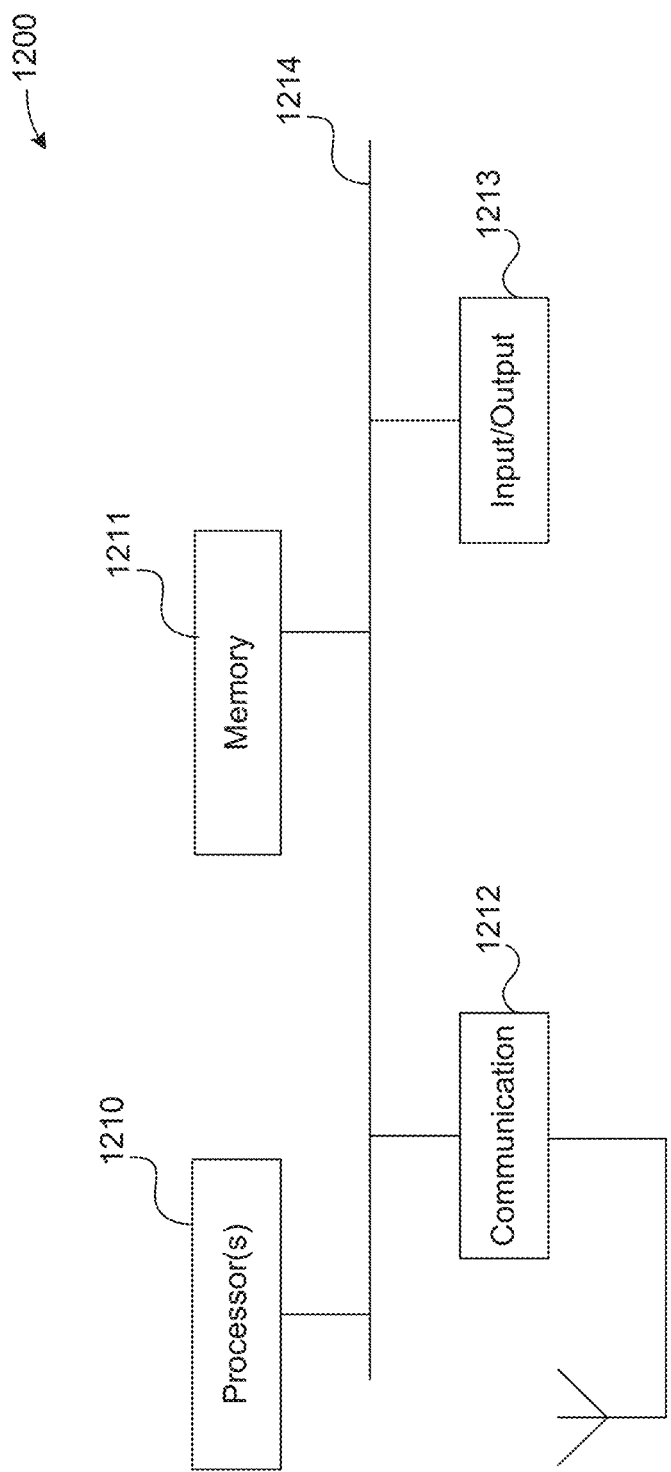
FIG. 1B is a block diagram of a computing device that may be used to implement the techniques introduced here.

FIG. 1B is a high-level block diagram showing an example of a computing device 1200 that can be used to implement one or more devices (e.g., gateway 110, mesh points 112a-112n, and user devices 130a-130n) introduced here.

In the illustrated embodiment, the computing system 1200 includes one or more processors 1210, memory 1211, a communication device 1212, and one or more input/output (I/O) devices 1213, all coupled to each other through an interconnect 1214. The interconnect 1214 may be or may include one or more conductive traces, buses, point-to-point connections, controllers, adapters and/or other conventional connection devices. The processor(s) 1210 may be or may include, for example, one or more general-purpose programmable microprocessors, microcontrollers, application specific integrated circuits (ASICs), programmable gate arrays, or the like, or a combination of such devices. The processor(s) 1210 control the overall operation of the computing device 1200. Memory 1211 may be or may include one or more physical storage devices, which may be in the form of random access memory (RAM), read-only memory (ROM) (which may be erasable and programmable), flash memory, miniature hard disk drive, or other suitable type of storage device, or a combination of such devices. Memory 1211 may store data and instructions that configure the processor(s) 1210 to execute operations in accordance with the techniques described above. The communication device 1212 may be or may include, for example, an Ethernet adapter, cable modem, Wi-Fi adapter, cellular transceiver, Bluetooth transceiver, or the like. Depending on the specific nature and purpose of the processing device 1200, the I/O devices 1213 can include devices such as a display (which may be a touch screen display), audio speaker, keyboard, mouse or other pointing device, microphone, camera, etc.

Automated Mesh Point Survey and Guided Installation

As previously mentioned, it is generally hard to cover a relatively large area using a single AP. A multiple AP solution (i.e., a wireless mesh network) to cover the whole area is an attractive alternative, but there are also many challenges. Among them, the user needs to find the dead spots, the user needs to know what kind of wireless coverage (e.g., signal strength, throughput (TPUT), goodput (or application-level throughput)) is capable to carry at least the Internet speed or other services through the deployed environment, the user needs to know where to install the mesh points, and the user needs to verify that the current mesh installation is providing the coverage needed around the home, and as an additional option, to receive suggestions on how to improve the wireless coverage when needed or when the user purchases an upgraded Internet service.

Therefore, one aspect of the present disclosure is to provide a portable device (e.g., by using a mobile software application running on a user's mobile computing device) with the capability of assisting the user throughout the site survey and installation process. Generally speaking, the disclosed application can assist the user to connect the first mesh point to where the user's gateway (e.g., a cable modem) is and enter personal settings (e.g., a desired SSID/password). Then, the application can guide the user to walk around the environment to determine where the dead spots (i.e., locations with poor WLAN reception) are. Afterwards, the application can instruct the user where to install the additional mesh points to increase the coverage to reduce or eliminate the dead spots. The application can verify whether the installation is a good one (e.g., functioning properly and achieving a target transmission rate), and if not, provide feedbacks to the user accordingly. Afterwards, the application can perform an Internet speed test, and can allow the user to walk around to perform coverage surveys to verify that the available transmission rate and coverage meets his or her need. If the user later wants to upgrade the Internet connection and add additional mesh points to provide more bandwidth to the existing network structure, the application can assist the user to achieve that as well. As such, example functions of such portable device (e.g., as enabled by the mobile application) introduced here include:

(1) surveying the wireless coverage in the environment;

(2) communicating the type and capabilities of the user's device (on which the mobile application is installed) to the wireless mesh network (e.g., to a controlling entity, which may be the mesh point 112a functioning as the main AP, another mesh point in the network, or a cloud-based server);

(3) setting up the configurations of the mesh network, such as service set identifier (SSID), password, and other attributes of mesh network, using Bluetooth, and/or other forms of wireless communication;

(4) measuring the Internet speed to set a target transmission rate for a desirable wireless coverage in home;

(5) guiding the installation of mesh points in home to provide the target wireless coverage; and (6) providing verification of the target wireless coverage during and/or after the installation of mesh points.

Note that the type and capabilities of the user's device can include what type of device it is (e.g. Apple iPhone 6S™, Samsung Galaxy S6™, and/or any other related information such as antenna configuration, protocol capabilities, etc.). As is described in more detail below, the device information can be used to determine how to map the coverage range of that particular device to the coverage range of a typical device (e.g., for transmission rate estimation, coverage estimation, roaming decisions, etc.). The information can also be used to translate the measurement results obtained on that particular device to estimated mesh-to-mesh coverage in the wireless mesh network. The information can be used to see if the particular device supports roaming instructions, and if so, what type.

Figure 2:
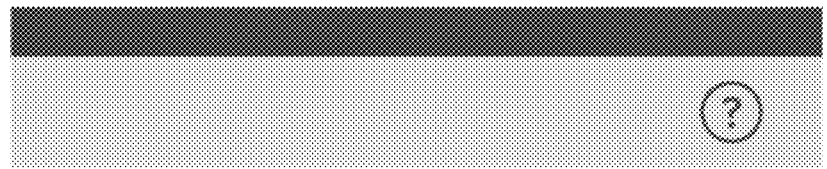
FIG. 2 is an example user interface illustrating a welcome page outlining the general functionalities of a mobile software application that implements one or more techniques introduced here.
Figure 2:
Figure 2:
Figure 2:
Figure 2:

FIG. 2 is an example user interface illustrating a welcome page outlining the general functionalities of a mobile software application that transform the user's mobile device to implement one or more techniques introduced here. As illustrated in FIG. 2, the interface generally outlines the process of assisted installation and configuration of the mesh points, by breaking it down into three segments (not in a necessary order): (1) Installation of the main mesh point (e.g., mesh point 112a); (2) Installation of the additional mesh points (e.g., mesh point 112b-112n); and (3) Testing of the installed mesh points (e.g., mesh points 112a-112n). The interface may include a start button that allows the user to initiate the process.

Figure 3A:
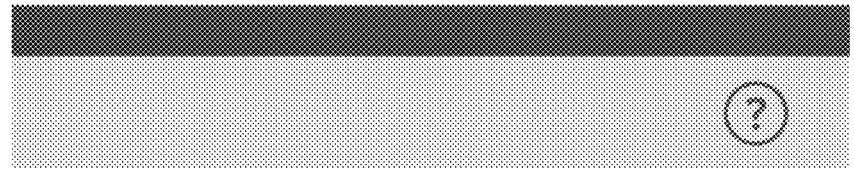
FIGS. 3A-3F are example user interfaces illustrating processes for assisting a user in installing the first, main mesh point in a wireless mesh network.
Figure 3A:
Figure 3A:

FIGS. 3A-3F are example user interfaces illustrating processes for assisting a user in installing the main mesh point in a wireless mesh network. As illustrated in FIG. 3A, first, the user is instructed to install and launch an mobile application on his or her user device, such as a smart phone (e.g., device 130a). Upon the execution of the application on the user device 130a, the application prompts the user to install the main mesh point 112a at a desired place in the environment (e.g., next to the home gateway 110). The main mesh point 112a can be connected to the gateway 110 via a wired (e.g., IEEE 802.3 wired Ethernet) or wireless (e.g., IEEE 802.11 WLAN) connection, even though a direct, wired connection is typically more desirable for the inherent robustness and potentially higher transmission rate. In general, the connection between the main mesh point 112a and the gateway 110 should be reasonably close and without substantial interference, such that the main mesh point 112a does not become a bottleneck for the bandwidth to the network 120.

Figure 3B:
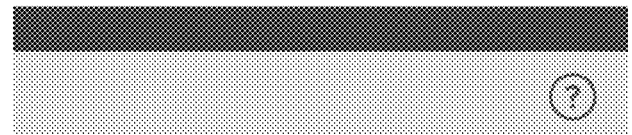
Figure 3B:
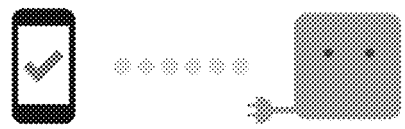
Figure 3C:
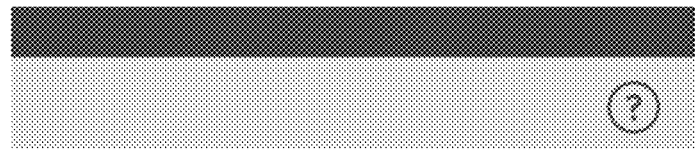
Figure 3C:
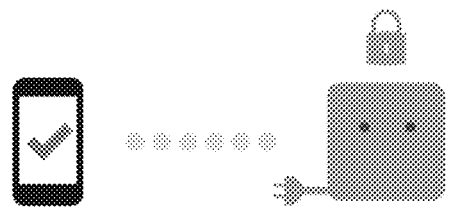
Figure 3C:
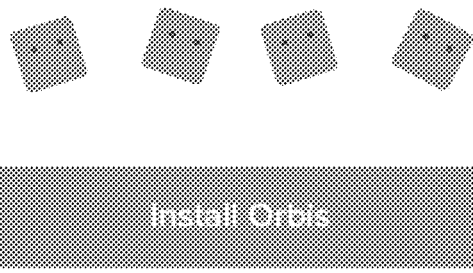

In one or more implementations, after the physical installation of the main mesh point 112a, the application can cause the user device 130a to connect to the main mesh point 112a using a default set of service set identifier (SSID) and password. This connection can be performed by the application automatically (e.g., upon the detection of the availability of the default SSID) or after receiving an input from the user, such as the activation of a software button "I've plugged him in," shown in FIG. 3A. This process of establishing connection to the main mesh point 112a is illustrated in FIG. 3B. There can be a number of variations on the exact mechanism of connecting to the main mesh point 112a, depending on the device type and the operating system of the user device 130a. In one embodiment, if the user device 130a is an Android™ device, the application may connect to the default SSID and password by accessing the configuration of the WLAN circuitry on the device. Alternatively, if the user device 130a is an iOS™ device for example, the application can instruct the user how to connect to default SSID. In yet another alternative, when available, the application may utilize other types of wireless connection (e.g., Bluetooth™) first for establishing the initial communication and then hand off to WLAN, to make the installation procedure easier. For example, mechanisms such as Generic Attribute Profile (GATT) of Bluetooth Low Energy™ (BLE) may be used to exchange the SSID, password, and/or any other relevant profile and user data over a BLE connection to the main mesh point 112a first for purposes of establishing WLAN connection between the user device 130a and the main mesh point 112a. In variations, classic Bluetooth™ may also be used to carry profile information when available.

Figure 3D:
Figure 3E:
Figure 3E:
Figure 3E:
Figure 3E:
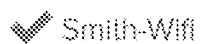
Figure 3E:
Figure 3F:
Figure 3F:
Figure 3F:

As illustrated in FIG. 3B, the application can also provide an opportunity (e.g., via a button) for the user to convey to the main mesh point 112a a desired SSID and password for the mesh network. If there is a preset SSID conflict situation (e.g., when more than one mesh point is nearby using the same default SSID), the application can detect the conflict and prompt the user to resolve the conflict by entering a customized, desired SSID and password for the mesh network. FIG. 3D illustrates an interface that may be implemented in the application introduced here for receiving user selected wireless network credentials for the mesh network, including an SSID and a password. The desired SSID/password can be used to further configure the first, main mesh point 112a and the subsequent mesh points 112b-112n. When the user device 130a successfully connects to the main mesh point 112a, a screen such as FIG. 3C can be displayed by the application to prompt the user to proceed further with the installation. FIGS. 3E and 3F illustrate additional or alternative embodiments of the user interfaces illustrated in FIGS. 3B and 3C.

After the main mesh point 112a is installed successfully, in some embodiments, the application measures the Internet speed from the main mesh point 11a, and uses that as a basis for a target of how much wireless speed needed to be supported across the entire mesh network. That is to say, the measured Internet speed can be used to determine a target speed rate for the mesh network. According to some examples, the Internet speed may be measured from the main mesh point 112a and then reported to the application using WLAN, Bluetooth, or any other suitable links between the main mesh point 112a and the user device 130a. Alternatively, the Internet speed may be measured by the user device 112a through a connection (e.g., a wireless connection) with the main mesh point 112a, even though the measurement may be less accurate than being measured directly through the main mesh point 112a. Whether the Internet speed is measured from main mesh point 112a or the user's portable device 130a, it may be measured by adopting one or more of the following example ways: flooding-based tools with large multiple Transmission Control Protocol (TCP) sessions; file download time; Probe Gap Model (PGM) tools that send back-to-back probes and estimate the available bandwidth based on the dispersion observed at the receiver; and/or Probe Rate Model (PRM) tools that send probes at different rates. Note that, for PRM tools (e.g., Pathload or ABwProbe), if the probe rate is higher than the available bandwidth, then the probes should be received at a lower rate (e.g., buffering the packets at the bottleneck link). The available bandwidth equals the maximum rate at which the sending rate matches the receiving rate. Also, note that for Internet speed measurement, a server in the Internet is generally necessary to generate the traffic, and therefore practical factors such server's general availability and bandwidth should be considered in the implementation.

Figure 4A:
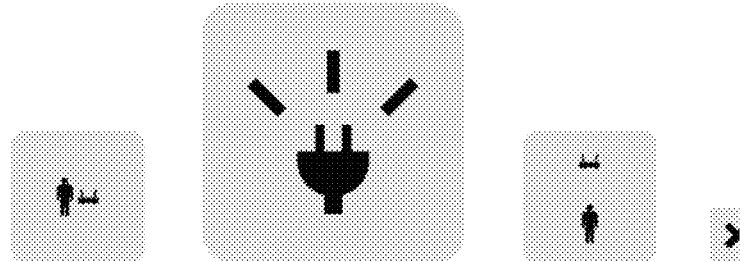
Figure 4C:
Figure 4C:
Figure 4C:
Figure 4C:

FIGS. 4A-4C are example user interfaces illustrating introductory processes for assisting a user in installing additional mesh points in the wireless mesh network. FIGS. 4A-4C may be implemented to provide the user with an overview of the automated installation guidance procedure, including dead spot finding, mesh point installation location guiding instructions, and WLAN coverage and connection speed verification after the installation.

FIGS. 5A-5D are example user interfaces illustrating processes for assisting a user in finding weak reception spots (or "dead spots") for potential locations to install additional mesh points.

Figure 5A:
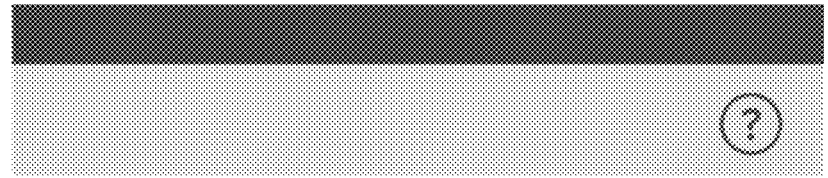
FIGS. 5A-5D are example user interfaces illustrating processes for assisting a user in finding weak reception spots (or "dead spots") for potential locations to install additional mesh points.
Figure 5A:

To begin, the user is prompted to use the user device 112a (and via the application) to conduct a wireless coverage survey. As illustrated in FIG. 5A, the user is instructed to walk around the environment to find dead spots (e.g., all the dead spots or the dead spots that matter to the user) using the application that is installed on the user device 112a. In accordance with the present disclosure, some embodiments of the application can cause the portable user device 130a to give feedback to the user regarding the quality of the wireless coverage of the current location.

More specifically, in accordance with a number of embodiments, the application can utilize one or more of the link rate estimation techniques, which are introduced herein further below, to estimate the wireless coverage of all the frequency bands (e.g., 2.4G, 5G, and/or other bands) using the frequency band (e.g., 2.4G) with which the user device 130a is connected. For example, if the user device 130a is connected to the 2.4 GHz frequency band, the application can use the link rate estimation techniques to estimate the available speed in the 5 GHz frequency band using statistics gathered from the 2.4 GHz connection.

Figure 5B:
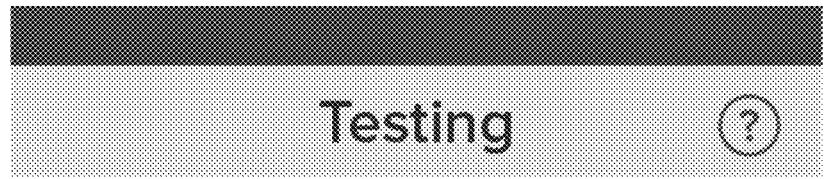
Figure 5B:
Figure 5C:
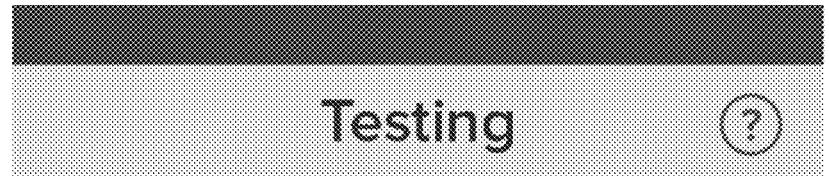
Figure 5C:
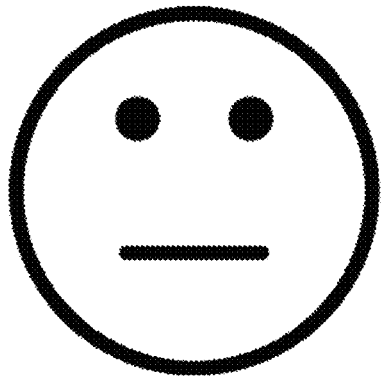
Figure 5C:
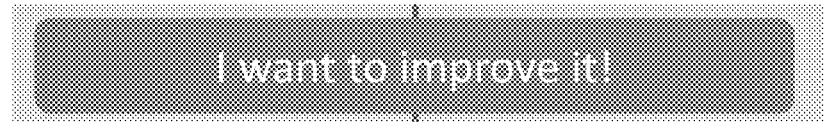
Figure 5D:
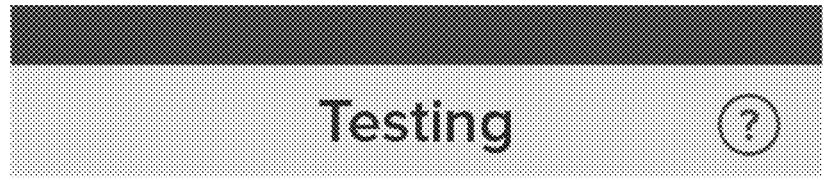
Figure 5D:
Figure 5D:
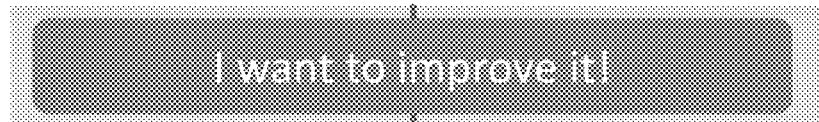

After the link speeds on various frequency bands are estimated, the quality of the wireless coverage at the current location is reported based on the target data rate that wireless mesh network is aimed to reach. The means of the reporting can be designed to be easily understandable by the layman user, such as "Great," "Good," "Bad," or any other user perceivable metric. Examples of such reporting are illustrated in FIGS. 5B-5D. One or more of the user interfaces used for reporting can include buttons to provide the opportunity for the user to upgrade the mesh network's coverage and/or link speed, such as illustrated in FIGS. 5C and 5D. In this way, the application further promotes the business opportunity for the user to purchase more mesh points.

With the knowledge of the locations of the dead spots, the application can guide the user to cover the discovered dead spots one by one.

Figure 6A:
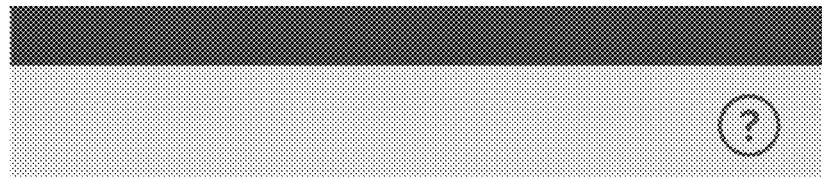
FIGS. 6A-6E are example user interfaces illustrating further introductory processes for assisting a user in installing additional mesh points in the wireless mesh network.
Figure 6A:
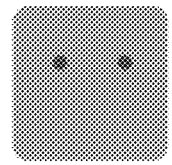
Figure 6A:
Figure 6B:
Figure 6B:
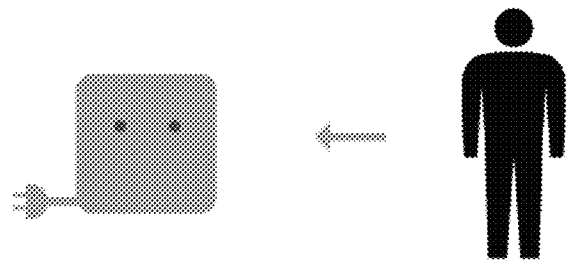
Figure 6C:
Figure 6C:
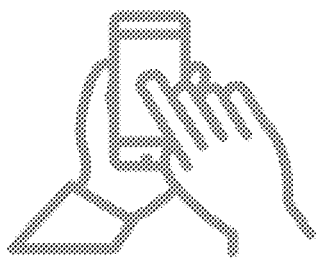
Figure 6D:
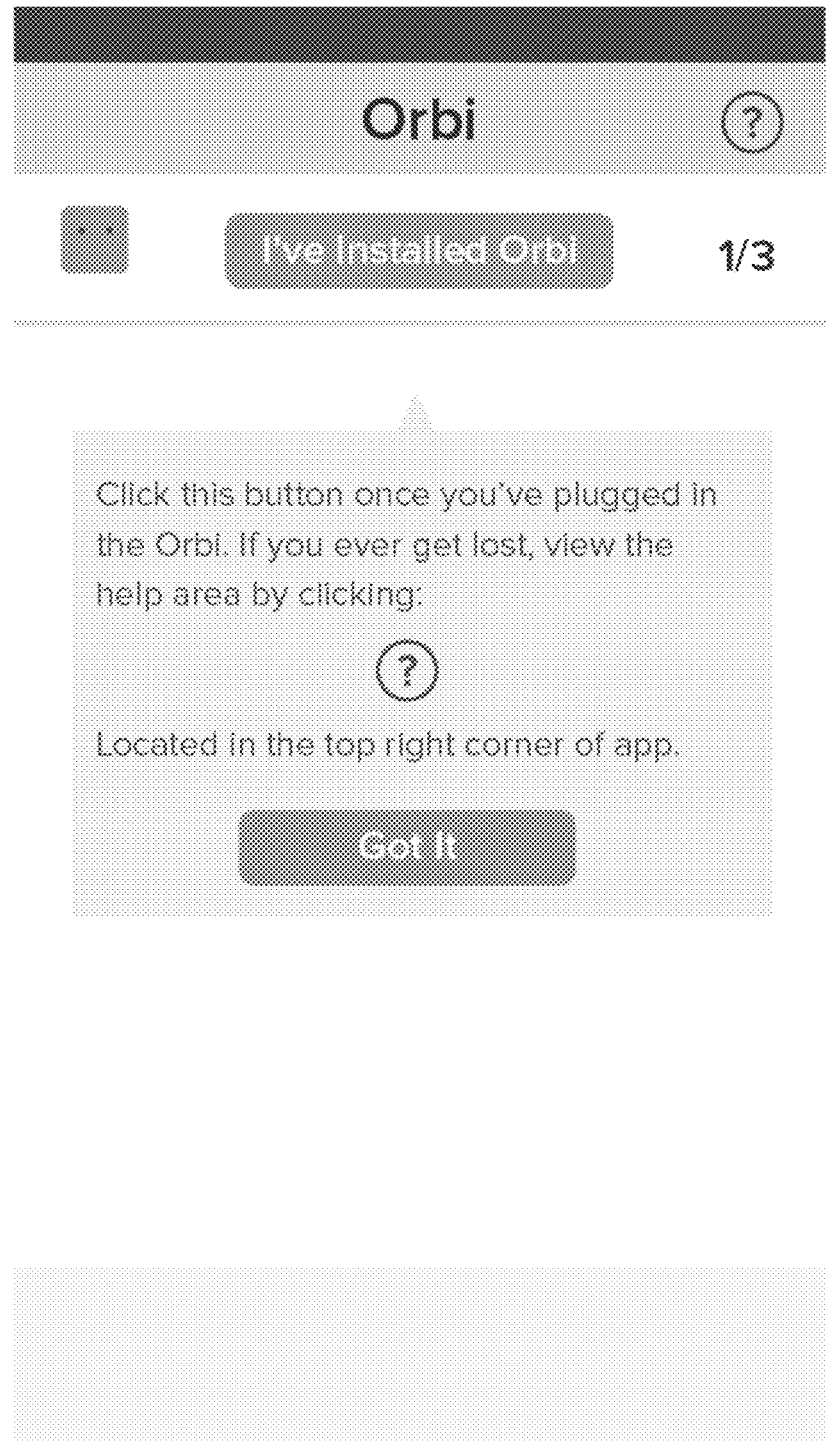
Figure 6E:
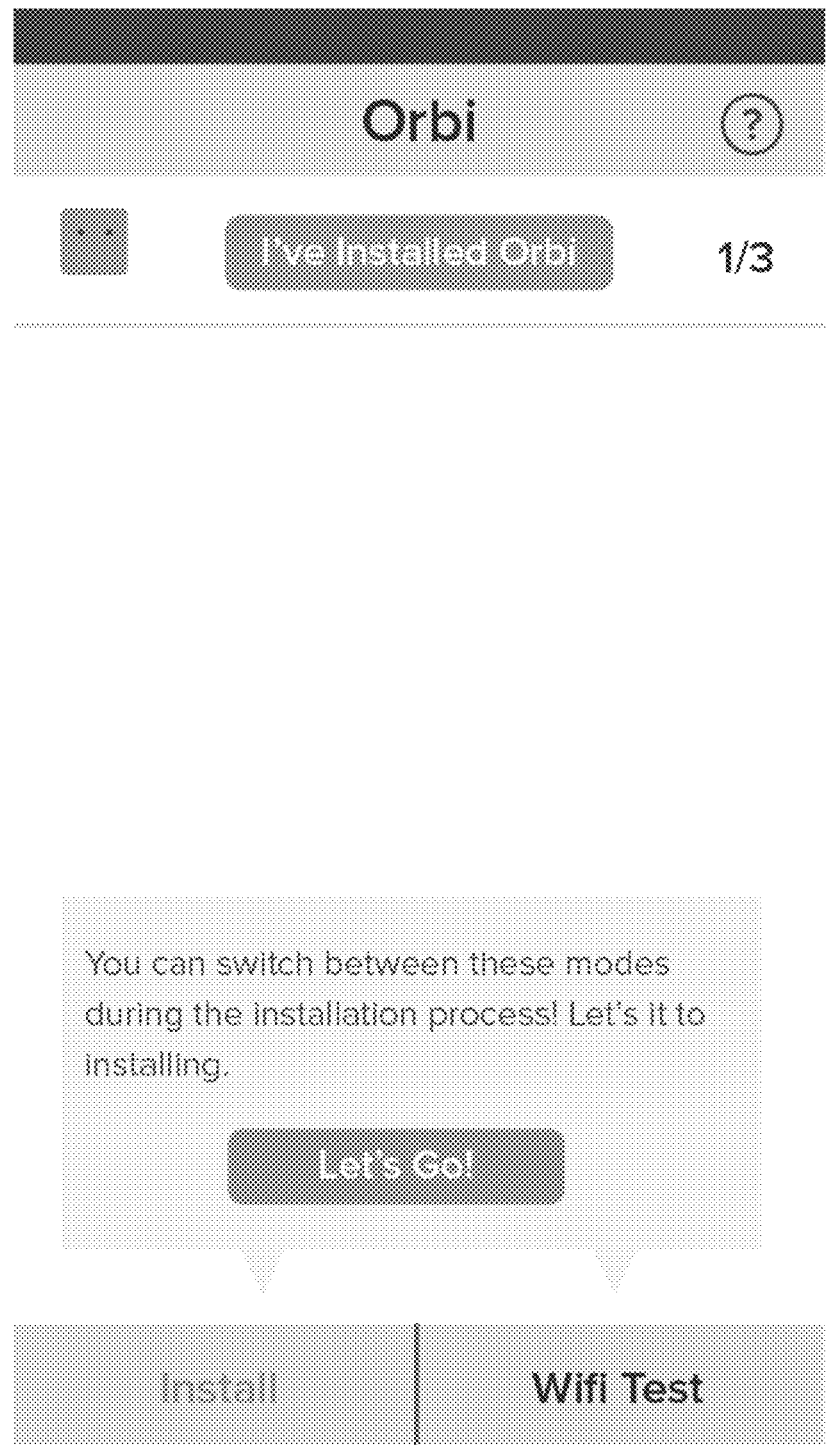
Figure 7A:
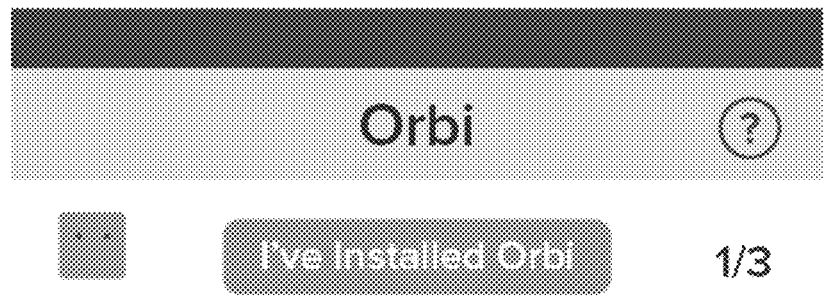
FIGS. 7A-7E are example user interfaces illustrating guiding instructions for assisting a user in installing additional mesh points in the wireless mesh network.
Figure 7A:
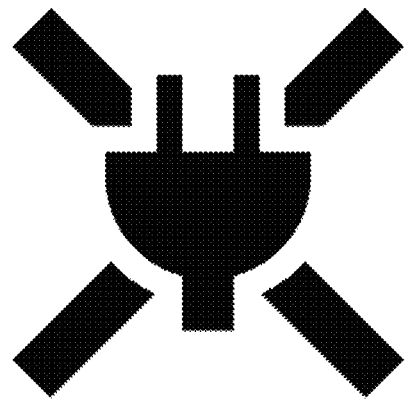
Figure 7A:
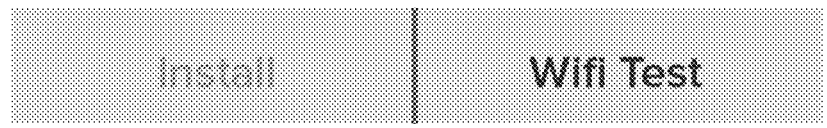
Figure 7B:
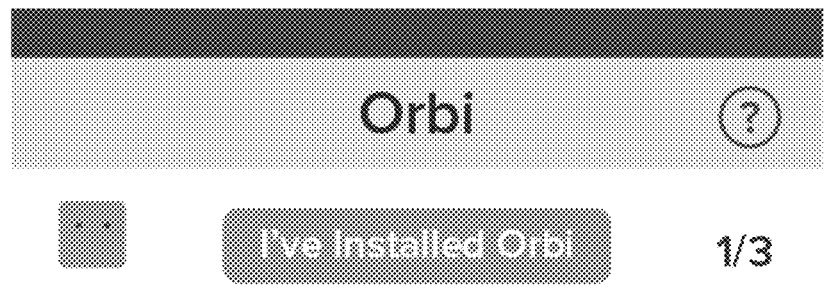
Figure 7B:
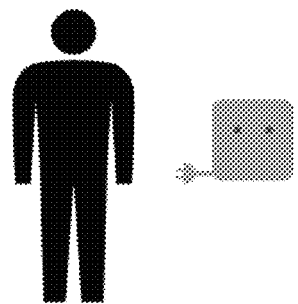
Figure 7B:
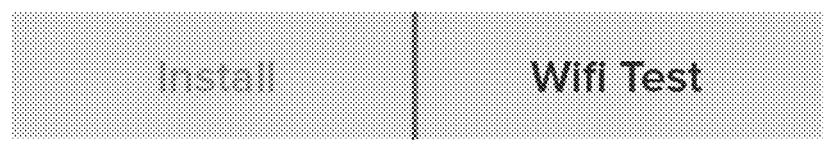
Figure 7C:
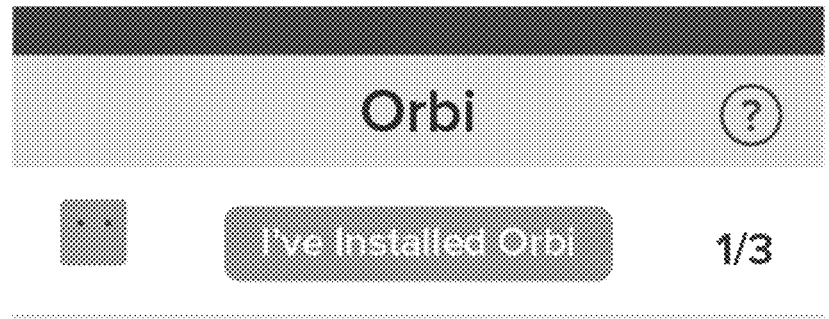
Figure 7C:
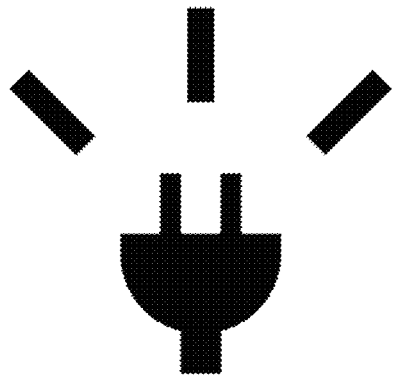
Figure 7C:
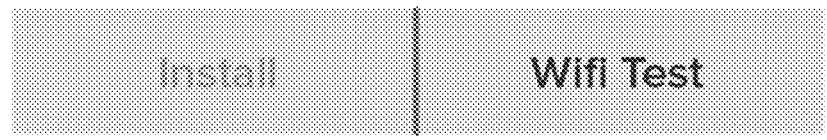
Figure 7D:
Figure 7D:
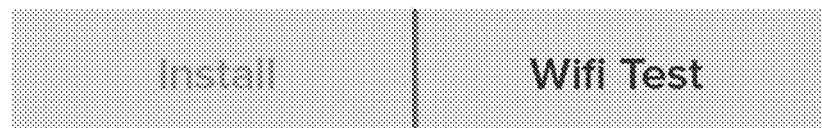
Figure 7E:
Figure 7E:
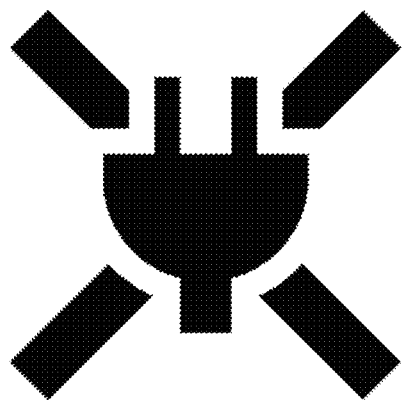
Figure 7E:
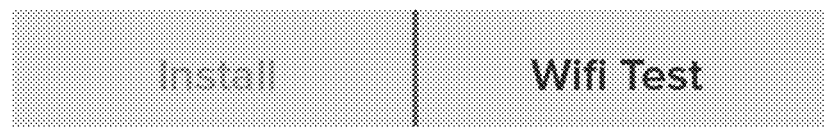

FIGS. 6A-6E are example user interfaces illustrating further introductory processes for assisting a user in installing additional mesh points in the wireless mesh network. First, as illustrated in FIG. 6A, the application instructs the user to physically carry the first additional mesh point 112b, and then, as shown in FIG. 6B, the application instructs the user to move back to the main mesh point 112a. Now, before the actual guided installation of additional mesh points starts to take place, it may be beneficial to brief the user on the remaining procedures, and acquaint the user with the interface and the possible graphical instructions. Example interfaces in FIGS. 6C-6E introduce to the user the two remaining items to go through: installation of the additional mesh points 112b-112n, and verification of the installation by running tests. A video demonstration of the procedure, such as visually showing the user how he or she should walk away from the main mesh point 112a while holding the user device 130a during the installation of the additional mesh points, can also be helpful. This may be initiated by the user with the example interface shown in FIG. 6C.

FIGS. 7A-7E are example user interfaces illustrating guiding instructions for assisting a user in installing additional mesh points in the wireless mesh network. After the instruction in FIG. 6B, the user is with the first additional mesh point 112b and at a location nearby the main mesh point 112a. Then, the user is instructed by the application to walk from the main mesh point 112a to a first dead spot. At the first dead spot (or as an alternative, continuously during the walk), the application employs one or more of the link rate estimation techniques introduced hereafter to monitor the wireless coverage, and automatically generate feedbacks to the user with regard to the location where the additional mesh points should be installed. Examples of such feedbacks or advices are: "Too close" (e.g., FIG. 7A), "Close" (e.g., FIG. 7B), "Good" (e.g., FIG. 7C), "A bit far" (e.g., FIG. 7D), and "Too far" (e.g., FIG. 7E). In some embodiments, to maximize the coverage, the user is instructed to install the additional mesh point(s) in the farthest possible place that is still considered "Good," e.g., the closet possible places between "Good" and "A bit far." The user can then install the additional mesh point 112b based on the automated guidance generated by the application.

Figure 8A:
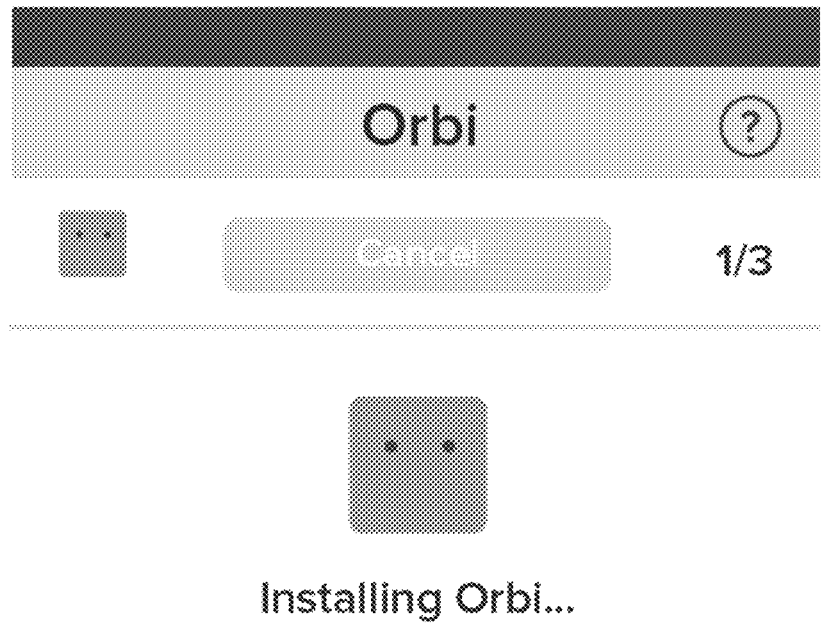
FIGS. 8A-8G are example user interfaces illustrating diagnostic processes of installed mesh points in the wireless mesh network.
Figure 8B:
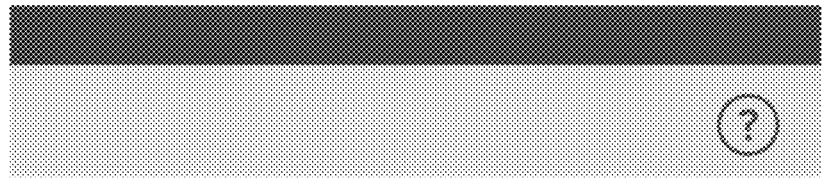
Figure 8B:
Figure 8B:

FIGS. 8A-8G are example user interfaces illustrating diagnostic processes of installed mesh points in the wireless mesh network. Once the additional mesh point (e.g., mesh point 112b) is installed, the application can communicate (e.g., using a default SSID/password) with the additional mesh point 112b and can cause the additional mesh point 112b (e.g., by changing the configuration of the WLAN circuitry, such as switching to an SSID and a password the user previously entered for the wireless mesh network, introduced above) to connect to the main mesh point 112a. It is noted here that the connection between the additional mesh point 112b and the main mesh point 112a is used only as an example for simplicity in describing the entire process. It is not necessary for the additional mesh point 112b to directly connect to the main mesh point 112a, even during the installation and initial configuration process; rather, the installed mesh point can connect to any suitable mesh point in the wireless mesh network. For example, the additional mesh point 112b can connect to another mesh point 112c, which may be already set up to function as a working part of the wireless mesh network. Example screen displays showing the progress of automatic configuring the additional mesh point 112b to connect with the main mesh point 112a are shown in FIGS. 8A-8B.

Figure 8C:
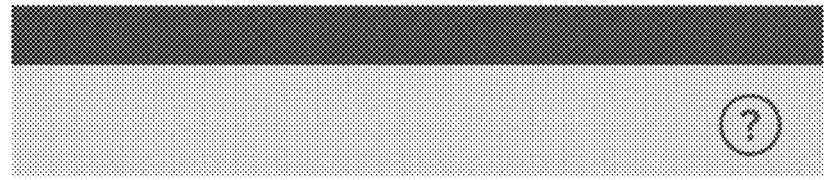
Figure 8C:
Figure 8C:
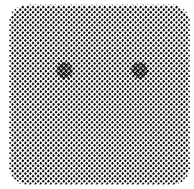
Figure 8C:
Figure 8D:
Figure 8D:
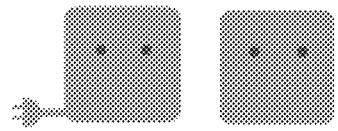
Figure 8D:
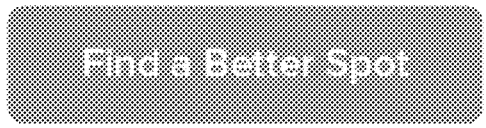
Figure 8E:
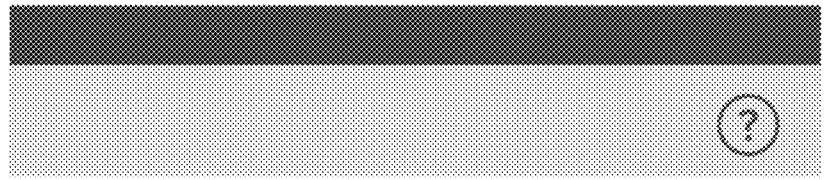
Figure 8E:
Figure 8E:
Figure 8F:
Figure 8F:
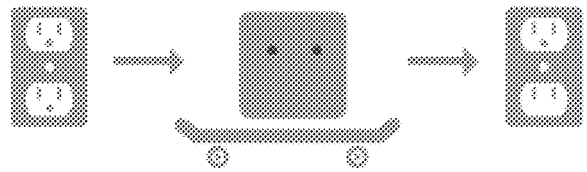
Figure 8F:
Figure 8G:
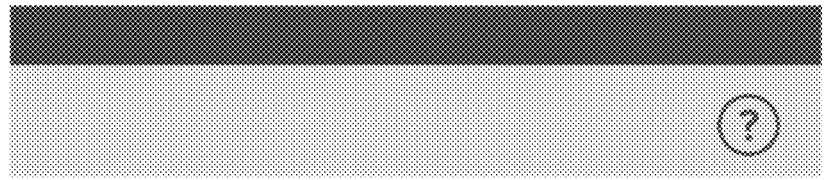
Figure 8G:
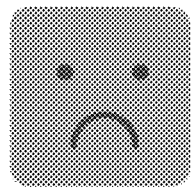
Figure 8G:

Then, the application performs a link rate estimation on all possible channels of communication between the installed mesh point 112b and the rest of the mesh network. Such process can be initiated by a software button, as shown in FIG. 8B. For example, a link rate estimation can be performed on a 2.4 GHz link, a 5 GHz link, a sub-1G link, or any other wireless link available. For the embodiments of mesh points that have powerline communication capability (e.g., HomePlug AV™ compatible), the link speed via the powerline can be estimated. In a number of implementations, the mesh points are equipped with more than one types of suitable hardware to implement a variety of network technologies, for example, a 2.4 GHz WLAN, a 5 GHz WLAN, a 2.4G Bluetooth™, a sub-1G radio link, a powerline Ethernet link, and so forth. The variety of network technologies can be used as a pool for selecting the best link for forwarding data traffic and also, in some embodiments, for implementing a dedicated backhaul link (discussed further below). According to one or more embodiments, the quality of link of the mesh point with other parts of the mesh network can be estimated using one or more of the following parameters: (1) the speed of communication between the mesh point and the closest mesh point or the mesh point that provides the highest transmission speed; (2) the number of hops in the network; and (3) the target throughput (or goodput) for a client. Link rate estimation techniques, including throughput and goodput determinations, are discussed in more detail below. Based on the link rate estimation, the application can provide corresponding instructions to the user. In some implementations, if the quality of the communication link between the mesh point being installed and the rest of mesh network is determined by the application to be sufficient (e.g., exceeding a select threshold), then the user is instructed to continue, such as shown in FIG. 8E. Otherwise, the application can instruct the user to move the mesh point depending on the result of the link estimation. As shown in FIG. 8C, if the estimated rate is too low, meaning that the mesh point is installed too far away, the application can instruct the user to move the mesh point closer to the nearest mesh point or the main mesh point. Conversely, if the estimated rate is too high, meaning that the mesh point is installed too close by, the application can instruct the user to move the mesh point farther away from the nearest mesh point or the main mesh point, such as shown in FIG. 8D. In one or more implementations, because the total number of hops the user will install may not be known to the system (e.g., by a controlling entity such as the main mesh point 112a) until the installation finishes, the application may place higher priority on maintaining the minimum required throughput in determining where to install additional mesh points. Further fine tuning of the location (e.g., FIGS. 8F and 8G) can be performed, if necessary, after all available mesh points are installed.

Once mesh points are installed successfully, the application can instruct the user to walk to a previously identified dead spot (e.g., discussed above with respect to FIGS. 5A-5D) to verify that the dead spot is mitigated or eliminated after the installation of the mesh points. An example of such an instruction is shown in FIG. 8E. If wireless coverage becomes available at the previously identified dead spot and if the quality of wireless becomes acceptable (e.g., over a certain threshold, such as the Internet speed available at the main mesh point), then the user is instructed to proceed to the next dead spot. If wireless coverage remains unavailable at the dead spot or if the quality is not acceptable, then the user can be instructed to walk back to the location of the last installed, working mesh point and try to install another mesh point toward the dead spot. As previously described, the software application running on the user's mobile device can guide the user in determining the location to install additional mesh points for mitigating or eliminating dead spots by continuously monitoring wireless coverage and estimated good put. A feedback mechanism similar to what is discussed above can be used (e.g., too close, close, good, a bit far, far). This process can continue till there is acceptable wireless coverage at the dead spot.

Once a dead spot is covered, the user is instructed to check the other known dead spots in the environment. As the user walks toward the second or another subsequent dead spot, the application and the mesh network can work together to provide corresponding feedback to the user about a suggested location of for additional mesh point installation. In one or more implementations, the application can utilize those mesh points that are already installed, and take into consideration the possibility of roaming to other existing mesh points when determining the location for the next mesh point. For example, the application can consider or can cause the user's mobile device to roam to another mesh point (e.g., the closest one) while the user searches for dead spots. The application may also provide relevant information (e.g., measured readouts) to the controlling entity of the mesh network so as to help the mesh network perform roaming more effectively. More details regarding roaming techniques are discussed below.

Figure 9:
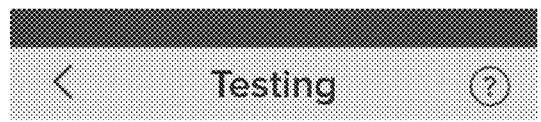
FIG. 9 is an example user interface illustrating another diagnostic process for installed mesh points in the wireless mesh network.
Figure 9:
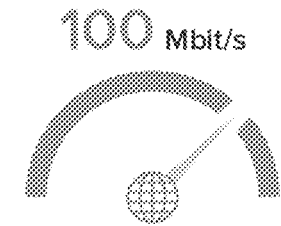
Figure 9:
Figure 9:
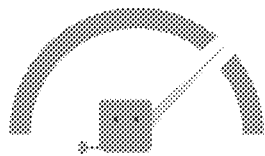
Figure 9:
Figure 10:
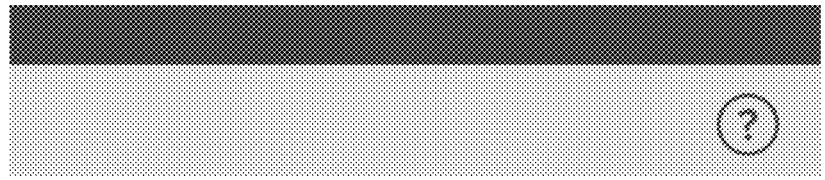
FIG. 10 is an example user interface illustrating an optional process for installing additional mesh points for bandwidth (e.g., as opposed to coverage) in the wireless mesh network.
Figure 10:
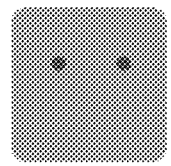
Figure 10:

When the user completes the elimination or mitigation of all the known dead spots he or she desires, the user can verify the coverage by performing a survey using the application and the mobile device. An example interface of a survey is shown in FIG. 9. If a faster speed is desired by the user, then the user can instruct the application to provide further guidance regarding the location to install additional mesh points to improve the speed covered in the mesh network, such as shown in FIG. 10.

Figure 11A:
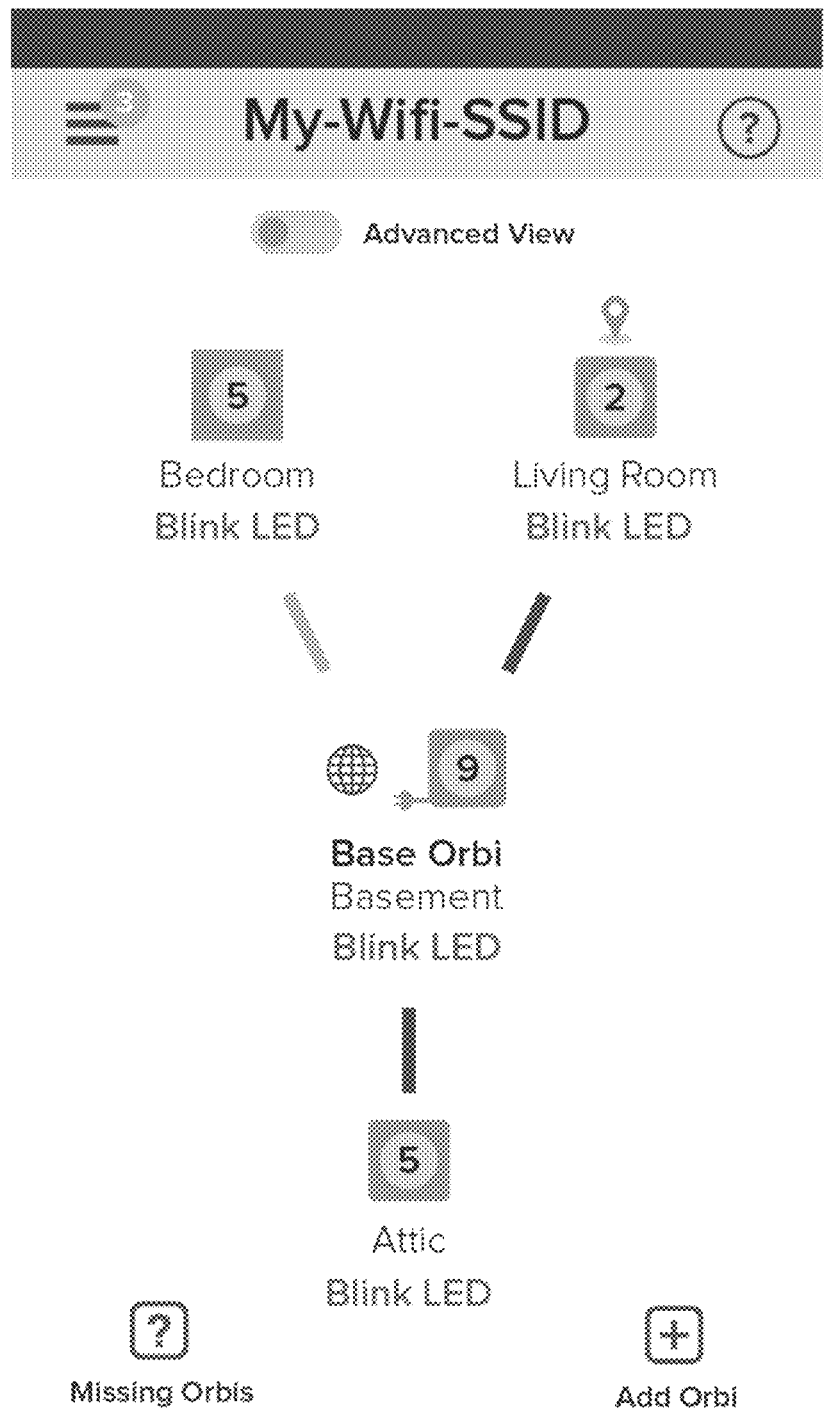
FIGS. 11A-11C are example user interfaces illustrating further diagnostic and configuration processes of the wireless mesh network.
Figure 11B:
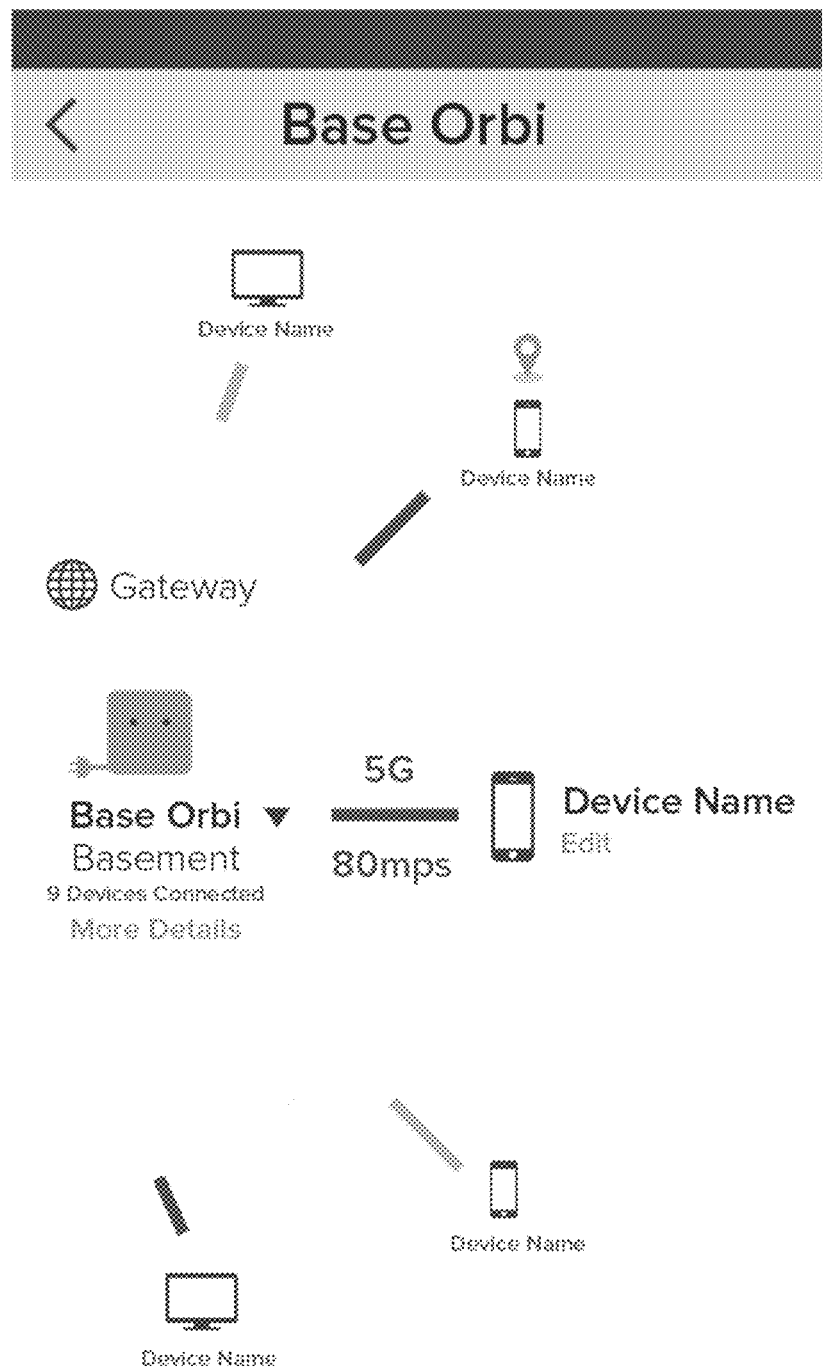
Figure 11C:
Figure 11C:
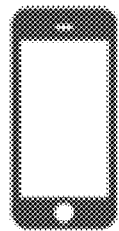

If anything within the deployed environment changes that results in a change in the wireless coverage, the application can be used to modify the mesh network and/or to install more mesh points. In some examples, the application may include specification of different kinds of mesh point products available, and can guide the user to a recommended kind of mesh point for the user's specific environment (e.g., in view of the existing mesh network and environmental limitations) and need (e.g., to provide the desired speed and coverage). If the Internet speed changes (e.g., as a result of changing Internet service provider (ISP) plans), then the application can be used to adjust the mesh network in order to meet the new targets. FIGS. 11A-11C show example user interfaces illustrating further diagnostic and configuration processes of the wireless mesh network. In the shown examples, the interface allows for the user to view the current link status of each link in the mesh network. The link can be color coded by the detected connection speed. The user can also specify the type of mobile device (e.g., FIG. 11C) such that the information can be used for adjustment and guidance purposes.

Certain embodiments provide the ability to customize the guidance (e.g., how to hold the device during link estimation) and/or mesh network functions (e.g., whether to roam the device, how to roam, or what frequency band to connect) based on the type of device that the user has. Specifically, because it is likely that the mobile device is hand-held by the user, how exactly the user holds the device (e.g., the angle the device is held (which affects the antennas' orientation), or the location the device is held as compared to where the antennas are) can affect the wireless performance of the mobile device, which in turn affects the accuracy of the above-discussed measurements. Accordingly, some embodiments of the disclosed application may utilize one or more orientation sensors located on the user's mobile device (e.g., gyroscope, accelerometer, compass, gravity sensor, or any other suitable sensor, for obtaining the orientation information of the user device), and use the orientation information as a parameter to adjust how the application maps the measured wireless performance to the wireless coverage at the location where the mobile device is held. In some examples, the application can guide the user on how to hold the mobile device (e.g., to hold at a preferred angle, or to stay away from certain reception sensitive portion of the particular device) in order to get consistent survey results. In a number of embodiments, the orientation and/or other sensory information may also be used to estimate which direction the user is walking toward, which in turn can assist the application in determining the guidance instruction used during the installation process.

Link Rate Estimation in a Wireless Mesh Network

The disclosed embodiments can utilize, through a software application, the user's mobile device to perform automated mesh network installation guidance. To facilitate the guidance, embodiments of the software application is to perform quality estimation of link between mesh points in order to determine whether a particular mesh point's installed location is a good one, to check and verify wireless network coverage, and to check for the throughput of the Internet at various locations in the environment. As one example scenario, during a mesh network installation or configuration process, the user can be provided with opportunities (e.g., illustrated in FIGS. 5A-5D) to find the dead spots using the mobile device. As such, the user's mobile device is associated to the closest mesh point to the dead spot. Then, the user is instructed to walk toward the dead spot while holding the user device, and the software application would continuously perform link estimation in order to suggest a location for installing additional mesh point(s). In another example scenario (e.g., after mitigating a dead spot), the user may be instructed to walk back to the first mesh point (e.g., FIG. 6B) and then walk to new dead spot. (In this case, the user device may be roamed to another mesh point that provides a better throughput while the user is relocating; roaming techniques are discussed below.) In these examples, while the user is relocating (e.g., walking), the wireless link quality can be continuously assessed such that a proper location can be suggested for new mesh point installment.

Further, once the new mesh point is installed, that new mesh point can send test packets to the mesh nodes that it can reach. Based on the results measured by the test packet transmission, the new mesh point can select one or more methods as its dedicated backhaul communication mechanism between itself and the rest of the mesh points in the mesh network. Dedicated backhaul communication techniques are discussed further below. In a number of the above mentioned scenarios, there is a need to have link estimation techniques for accurately estimating the link between mesh nodes.

However, it is observed in the present disclosure that a number of difficulties prevent traditional metrics from working well in the disclosed wireless mesh network environment. For example, because some portion of the estimation procedure is performed on the user's device, different types of phones (e.g., Apple, Samsung, or HTC), antenna configurations (e.g., 1×1, 2×2), as well as the WLAN technology supported (e.g., IEEE 802.11n, or 802.11ac) can all affect the measurement results. (FIG. 12 shows an example list of type of devices.) Another consideration is the size of the test packets. For example, it is observed that traditional "ping" packets would not be adequate. "Ping" is a computer network administration software utility used to test the reachability of a host on an Internet Protocol (IP) network. It measures the round-trip time for messages sent from the originating host to a destination computer that are echoed back to the source. Ping typically operates by sending Internet Control Message Protocol (ICMP) Echo Request packets to the target host and waiting for an ICMP Echo Reply. The program may report errors, packet loss, and a statistical summary of the results, typically including the minimum, maximum, the mean round-trip times, and/or standard deviation of the mean. However, because ping packets are typically very short, and the estimated rate based on such packets would not represent the actual throughput and Internet speed capability, and therefore they are not a good measure for setting the target transmission rate. Other example considerations include, but not limited to, frequency of the transmission of test packets, type of test packets, and so forth. For example, the test packets should not be of a type of packets (e.g., control packets) that are to be transmitted at a lower rate by the design of rate controlling mechanism in the communications protocol.

Accordingly, the software application as well as the mesh point disclosed herein can initiate a specific test data traffic to be sent between the user's mobile device and the mesh point with which the user's mobile device is currently associated. In many examples, the data traffic is mainly downlink data traffic from the mesh point to the user's mobile device; however, uplink data traffic can be estimated via the same or a similar manner. Then, the data rate as well as the received signal strength indicator (RSSI) (a measurement of the power present in a received radio signal) between the user's device and the mesh point can be used to estimate the quality of wireless mesh network's coverage at different locations. Depending on the implementation, the link estimation calculations can be done in the software application running on the user's mobile device, or alternatively, on a software or firmware operating on the mesh point. The software application can provide user interfaces (e.g., FIGS. 11A-11C) for monitoring the status of the links based on the estimated wireless coverage. This process can be performed as necessary, for example, when the network's configuration changes (e.g., Internet speed upgrade, new mesh points, or environmental changes such as a new microwave oven or a new piece of furniture).

Figure 20A:
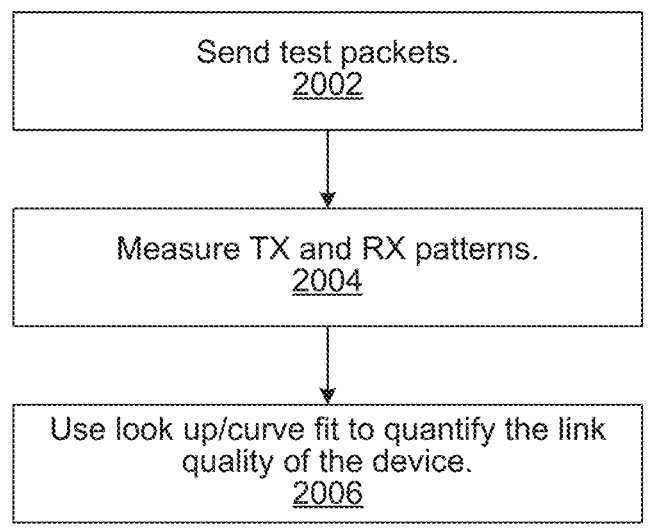
FIGS. 20A-20C are example flow charts illustrating methods for performing rate estimation, device characterization, and device classification in a mesh network disclosed herein.
Figure 20B:
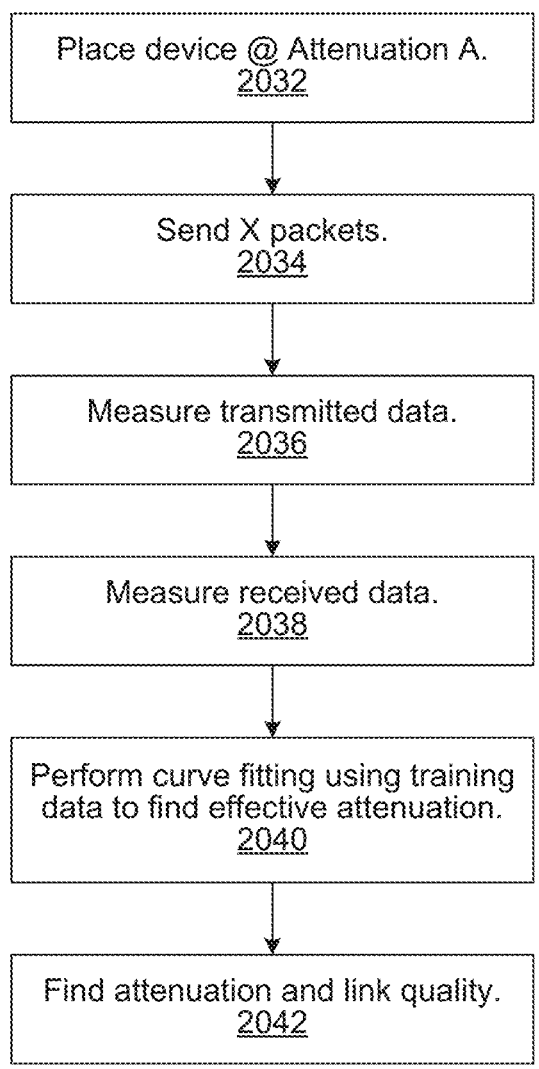
Figure 20C:
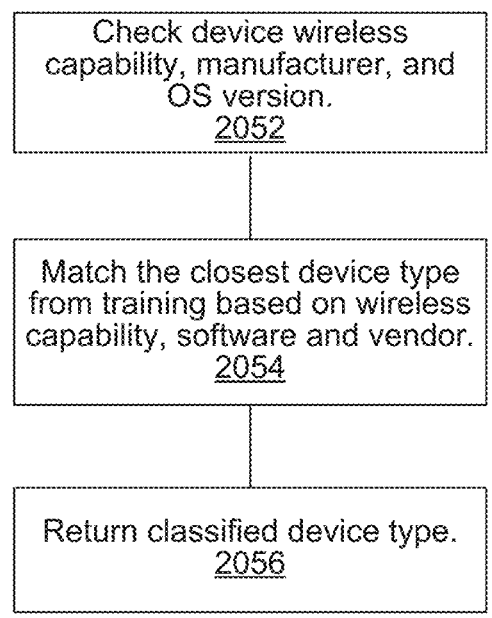

With simultaneous reference to flow charts 2000, 2030, and 2050 illustrated in FIGS. 20A-20C, example methods for performing rate estimation, device characterization, and device classification in a mesh network are further discussed below. These methods can be implemented and performed by a controlling entity of the mesh network in conjunction with the software application that runs on the user device (e.g., device 130a) and the mesh points. Depending on the embodiments, the controlling entity may be centralized (e.g., on the main mesh point 112a, FIG. 1A), distributed among the mesh points (e.g., on mesh points 112a-112n, FIG. 1A), and/or remotely controllable (e.g., via a remote server that is in the WAN IP Network 120).

More specifically, to perform the link rate estimation (e.g., for finding a suitable location to install an additional mesh point, in order to mitigate a dead spot), first the software application can send an instruction to the currently associated mesh point (which, in a number of implementations, would be the mesh point with the best link to the user's device based on the disclosed techniques) to start transmitting specific downlink test data packets to the user's mobile device (Step 2002). According to one or more embodiments, the packets are aggregated, such as Aggregated Mac Protocol Data Unit (A-MPDU) or Aggregated Mac Service Data Unit (A-MSDU) introduced in the IEEE 802.11 family of standards. In some embodiments, at least 10 data units are aggregated in the aggregated data packet (e.g., at least 10 MPDU per A-MPDU). One or more implementations provide that each MPDU is about 100K bytes, and the A-MPDU is at least 1M bytes. In some examples, tests can be performed on multiple available frequency bands (2.4 GHz, 5 GHz, or others) and/or different channels. The testing packets can be sent at an increasing rate, for example, 20 times a second, 30 times a second, and so forth, in order to test the capability. Each rate should at least be sustained long enough for the rate control of IEEE 802.11 protocol to converge or stabilize. FIG. 12A is a table illustrating the upper, center, and lower frequencies of different Wireless LAN (WLAN) channels in a typical 2.4 GHz frequency band, and FIG. 12B is a table illustrating example frequencies of different Wireless LAN (WLAN) channels available (e.g., in the United States) in a typical 5 GHz frequency band.

The mesh point can verify that the transmission of the aggregated packets are acknowledged ("ACKED"). Depending on the traffic's direction, either the mesh point or the user's device can determine the RSSI values for the last select number of packets are determined (e.g., allowing for rate controlling mechanism in Wi-Fi protocols to converge) (Step 2004). The RSSI values can be filtered to exclude momentary fluctuation (e.g., which may be a result of multi-path fading) does not negatively affect the accuracy of the estimation. In some embodiments, if the user's device is equipped with multiple antennas, MIMO RSSI values are taken into account. If the RSSI value is calibrated, then RSSI calibration can be used to offset the readings. In addition or as an alternative, if thermal compensation coefficients are available, then the RSSI value can be offset to accommodate thermal changes in radio receiver's gain. In some examples, power per rate can also be taken into account to accommodate different power consumptions for different rates, and the RSSI readings can be offset accordingly. In some examples, a Clear Channel Assessment (CCA) can be performed to estimate how much interference is there in the communication channel, and if the interference exceeds a certain level, the link estimation can switch to an alternative approach, for example, by using only RSSI estimations. In other examples, this interference determination step may be entirely skipped.

The estimation of the throughput (or effective link rate) can be based on the physical layer (PHY) data rate observed in the transmission of the test packets. Because the link is bidirectional, the measurements for the transmission part (from mesh point to user device) is separate from the measurements for the reception part. For measuring transmission performance, after the mesh point downloading test packets to the user's device, the transmission (TX) PHY rate is read back from the user's device for the last select number of packets (for the transmission is typically more unstable when initialized). Even though the specific implementation may differ depending on the application, one or more factors including the transmit data rate, coding, and/or bandwidth of the packet can be used in at least some embodiments to estimate the PHY rate. According to some embodiments, the amount of ACKs and other packets can be taken into account, and in some embodiments, may be filtered out of process that is used to calculate the average PHY rate. Other factors such as packet length and packet error rate may also be taken into account. In some embodiments, if the detected interference is too high, the estimated rate may be offset such that the software would not mistakenly determine that the location has become too far when the real reason for the estimated rate to be low is because of collision and noise. Measuring reception performance can be done in a similar fashion as the transmission, for example, by the user's device uploading test packets to the mesh points, which can determine the reception (RX) PHY rate.

With the measured PHY rate, a network throughput (TPUT) of the mesh network, having the additional mesh point installed at the location where the user's device is currently located, can be estimated (Step 2006). For purposes of discussion herein, the TPUT can be defined as the Transmission Control Protocol (TCP) layer TPUT that the client (e.g., the user's device) can pass through the newly installed mesh point (and through the mesh network) to the home gateway. In a number of implementations, the TPUT of the mesh network can be expressed as follows:

$$\frac{1}{TPUT} = TCP_{Overhead} \sum_{i=1}^{N_{hop}} \left( \frac{1}{LTPUT_i} + \frac{1}{USER\ DEVICE\ WIFI\ PHY\ Rate} \right) \quad \text{Eq. (1)}$$

where $LTPUT_i$ is the TPUT on the $link_i$, which is the TPUT between two mesh points. The TPUT between two mesh points are calculated using test packets after the installation of the two mesh points. The TPUT measured can be frequency band specific, and in which case, the TPUT number used here should correspond to the frequency band that the user's device is currently measuring or adopting. Based on experiments, $TCP_{overhead}$ value can be set to 0.1. In one or more embodiments, the $LTPUT=0.7\times EstimatedPHYRate_i$. The mesh network's $Internet_{speed}=Min\ (TPUT, speed_m)$, where $speed_m$ is the Internet speed measured at the main mesh point that directly connects to the gateway, which in turn connects to the Internet.

Note that, in order to implement mapping of measured TPUT performance (through the user's device) to the performance of the additional mesh point, different types of devices are tested in a controlled environment, and compared with mesh point's performance in the same controlled environment. Flow chart 2030 shows an example method for characterization of device type and collection of training data. For example, TPUT as well as other statistical data for different devices can be collected at various attenuation (Step 2032) by causing the device to engage in data traffic with a certain amount of packets (Step 2034). Measurements can be taken on both transmitting and receiving ends, and on all the available frequency bands (e.g., 2.4G and 5G). The measurement on the data transmitted to the device can generate RSSI values and RX rate for the device under the specific attenuation (Step 2036). The measurement on the data received from the device can generate TX rate and TX retry numbers for the device under the specific attenuation (Step 2038). The same procedure is performed at same attenuation points, and data collected, for a mesh point on the available frequency bands. Data can be statistically processed and analyzed (e.g., curve fitting) to find effective attenuation (Step 2040). Known statistical techniques, such as multi-variable linear regression, polynomial regression, or spline) may be used.

With the already gathered statistical data (e.g., TPUT versus Attenuation), therefore, the disclosed link rate estimation technique is able to map the performance of a user's device to the anticipated performance of a mesh point in a particular frequency band (Step 2042). In a similar fashion, it is also possible to map the performance of the user's device in one frequency band to the anticipated performance of the same device in another frequency band (Step 2042). Note that, because each type of user device may have a different wireless performance characteristics (e.g., when and how to drop connection in what frequency band), persons who implement the technique may need to use a testing procedure suitable to the type of device for gathering sufficient statistical data that can enable a meaningful mapping. A controlled environment can be used to perform tests on major device vendors and major device types to create enough statistical data to create a meaningful database for mapping purposes. For example, handsets, tablets and personal computers from each of select major device vendors can be tested to gather their wireless performance (e.g., TPUT) under different attenuation configurations.

FIG. 13A is a table illustrating the upper, center, and lower frequencies of different Wireless LAN channels in a typical 2.4 GHz frequency band. FIG. 13B is a table illustrating example frequencies of different Wireless LAN (WLAN) channels available (e.g., in the United States) in a typical 5 GHz frequency band. As illustrated in FIG. 13A, in the United States and Canada, there are 11 channels available for use in the 2.4 GHz Wireless LAN frequency band as defined by IEEE 802.11 family of standards.

Figure 14A:
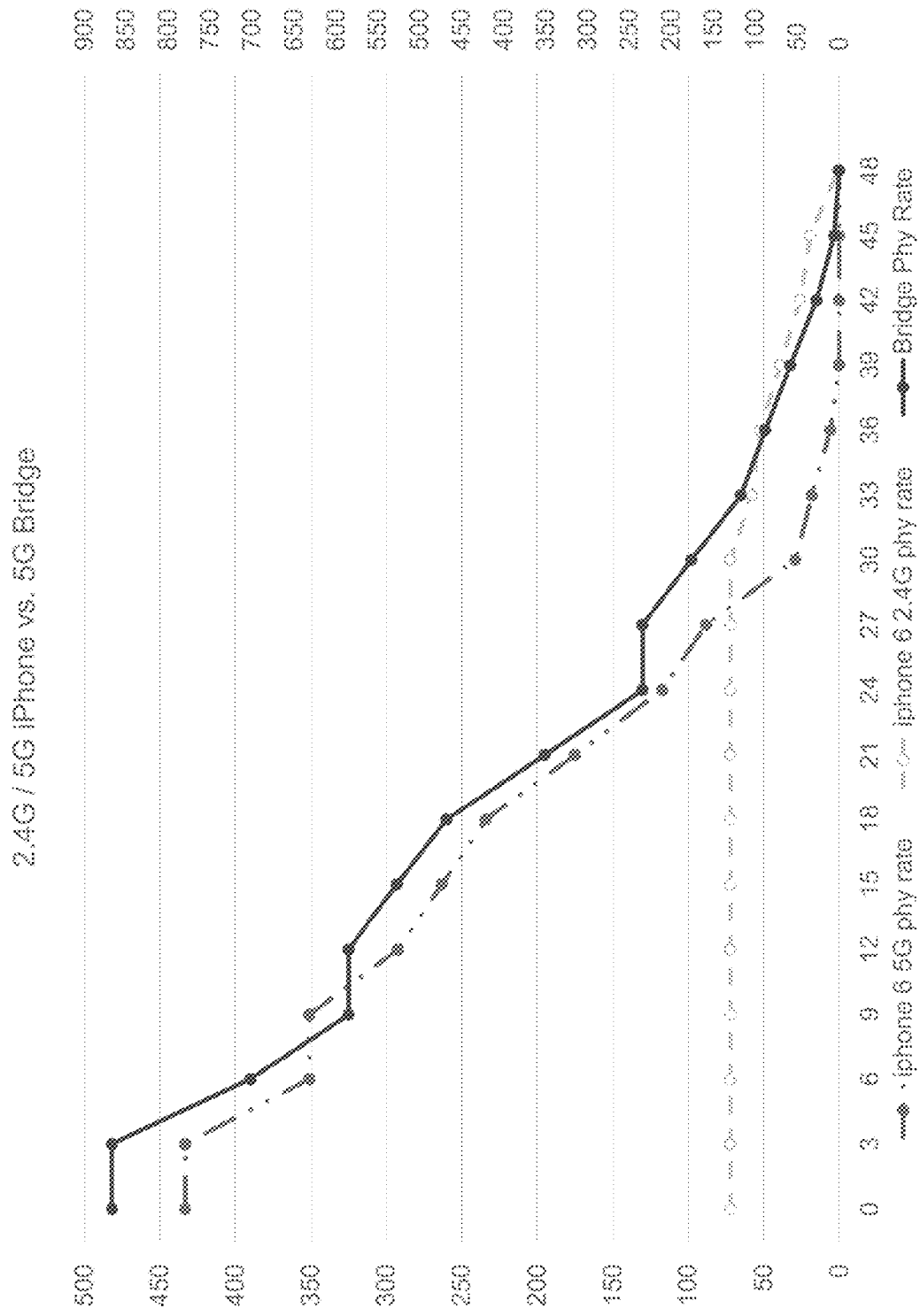
FIG. 14A-14C are different statistical data gathered for mapping the performance of a particular type of device to the anticipated performance of an additional mesh point, if installed at the same location.
Figure 14B:
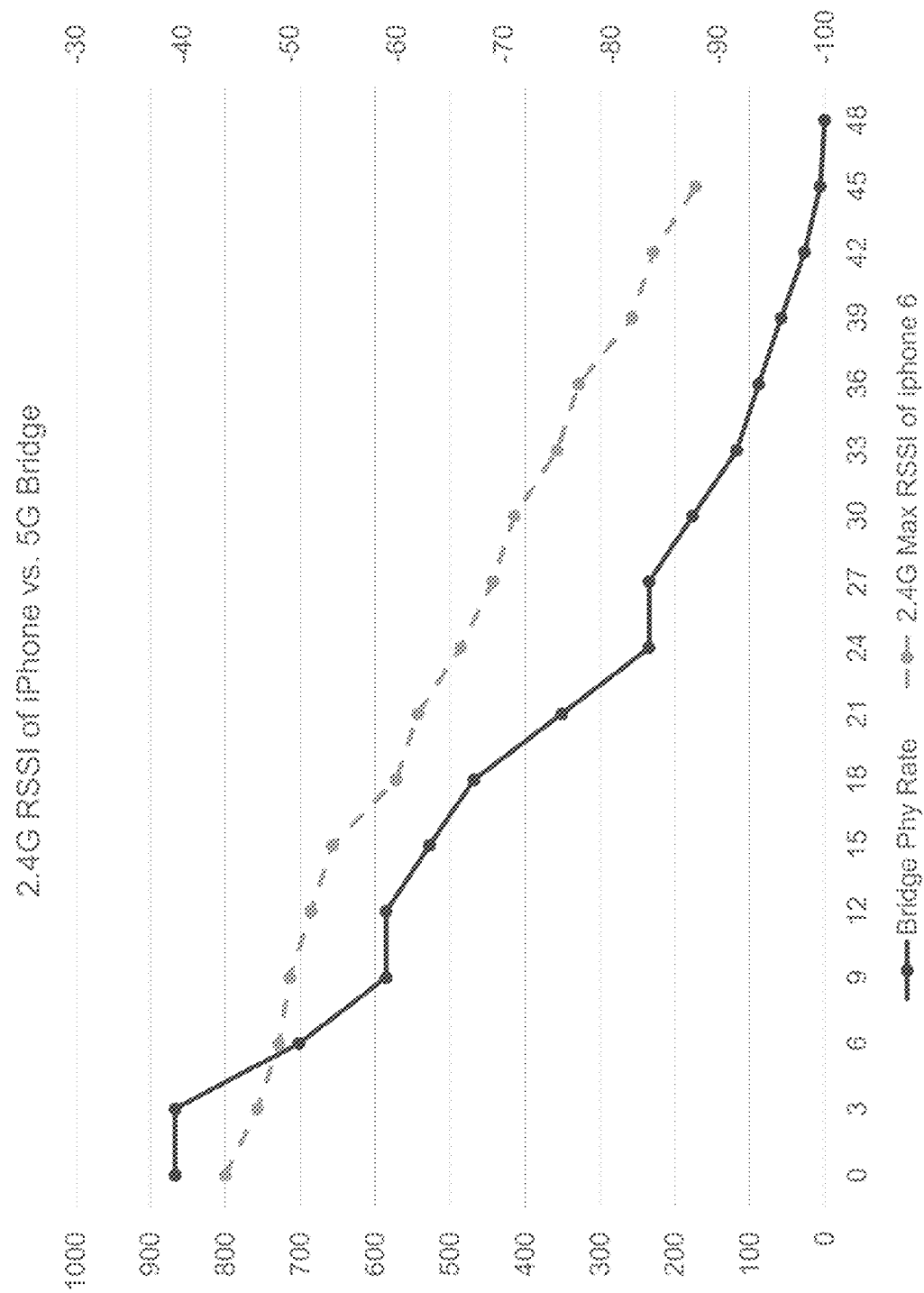
Figure 14C:
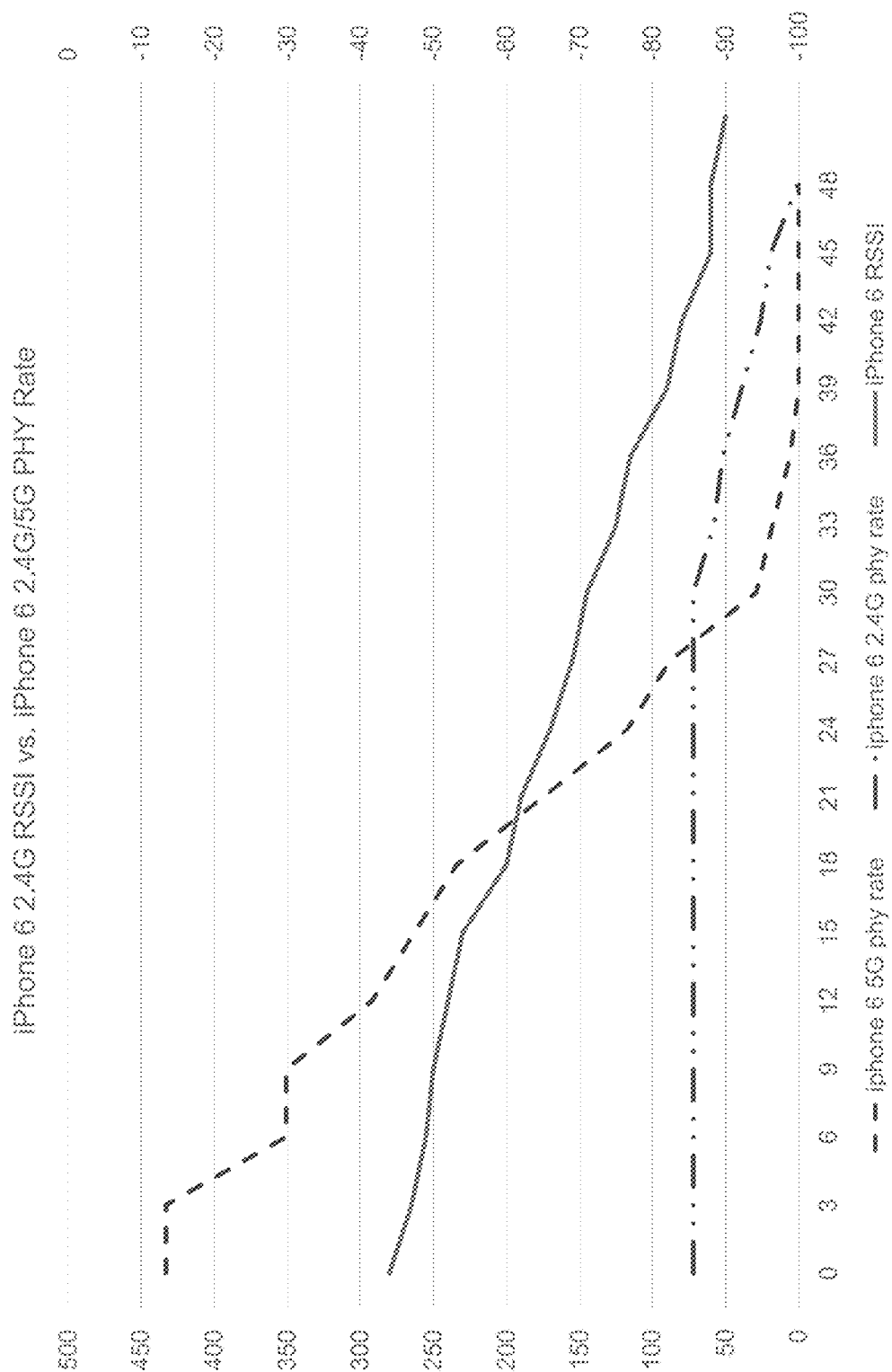

FIG. 14A-14C are different statistical data gathered for mapping the performance of a particular type of device to the anticipated performance of an additional mesh point, if installed at the same location. In particular, the example device is an Apple iPhone 6, which is an IEEE 802.11ac device with a 1×1 antenna setup. In this particular example, because it is observed that the device operating in 5 GHz may disconnect more easily than what would have been for a mesh point, 2.4 GHz frequency is used to check for wireless coverage during the network installation. This is an example of the customization of testing procedure discussed above.

In some implementations, a Probe Request (i.e., a special type of 802.11 packet) can be used to detect the type of the user's device. When suitable (e.g., when the device may disconnect at 5 GHz more easily than a mesh point), the software application and/or a daemon (i.e., a computer program that runs as a background process) operating on the mesh point can direct the user device to use only a certain frequency band (e.g., 2.4 GHz) during installation (e.g., by using Probe Suppression or other applicable methods). In some embodiments, the software application operating on the user's device can communicate with the mesh point (e.g., to a daemon running on the mesh point) about the exact device type. Additionally, if the device type is unknown or a type that is not documented in the database, then a generic device type may be used. The generic device type can have a profile that is the average of devices of the same configuration (e.g., 802.11ac, 1×1). Additionally or alternatively, flow chart 2050 shows a method that can be utilized for device classification. The method can be performed, for example, at device association in order to find a device equivalent in the database of training data. Device wireless capability (e.g., available network technology or antenna configuration) can be first discovered, as well as the device's manufacturer information and operating system (OS) version information (Step 2052). Then, the closest device type from training can be matched based on the gathered information (Step 2054). Besides manufacturer and OS information, the number of hops between the associating mesh point and the home gateway can be used to map to a corresponding attenuation data point in the training data. In this manner, using the database of training data, a classified device type can be decided (Step 2056).

With the above discussion in mind, the link rate between a potential mesh point and its closest (or otherwise best performed) existing mesh point can be estimated based on RSSI values and PHY rates, derived from the test packet measurements between the user's device and the existing mesh point. Continuing with the above iPhone 6 example, based on the experiment results, the following pseudo code can be used for estimating TPUT for a mesh point's performance at 5 GHz using RSSI and PHY rates measured at the user's device at 2.4 GHz.

```
<Start>
If 2.4G Rate ≥ 72Mbps or If 2.4G Rate < 26Mbps {
    If 2.4G max of RSSI of antenna ≥ −60 {
        If 2.4G Rate < 70Mbps, then report TPUT for Link-Orbi-5G = 175.5Mbps;
        If 2.4G Rate ≥ 70Mbps, then report TPUT for Link-Orbi-5G = 468Mbps;
    }
    If RSSI < −60 and If 2.4G Rate ≥ 70Mbps, then
        report TPUT for Link-Orbi-5G = 175.5Mbps;
    If −77 ≤ RSSI < −60 {
        Estimated Rate = 22.353 * (RSSI + 77) + 88;
        round Estimated Rate to the closest Modulation and Coding Scheme (MCS) rate;
        report TPUT for Link-Orbi-5G = closest MCS rate;
    }
    If −85 < RSSI < −77, then
        report TPUT for Link-Orbi-5G = 26Mbps;
    If RSSI ≤ −85, then
        report TPUT for Link-Orbi-5G = 1Mbps;
}
If 26Mbps ≤ 2.4G Rate < 72Mbps {
    Estimated Rate = 3.24 * (2.4G Rate − 26) + 27;
    round up Estimated Rate to the closest 5G PHY rate;
    report TPUT for Link-Orbi-5G = Max(Estimated Rate, RSSI Estimated Rate);
}
<End>
```

Note that the above pseudo code is merely an example measured for Apple iPhone 6. As mentioned above, different type of devices may have different character profile, and therefore the parameters and/or logic flow in the pseudo code should be adjusted according to the type of device that is used. The following is another example pseudo code for estimating TPUT for a mesh point's performance at 2.4 GHz using RSSI and PHY rates measured at the user's device at 2.4 GHz.

```
<Start>
If 2.4G Rate ≥ 72Mbps or If 2.4G Rate < 26Mbps {
    If 2.4G max of RSSI of antenna ≥ −70, then
        report TPUT for Link-Orbi-2G = 144Mbps;
    If −84 ≤ RSSI < −70 {
        Estimated Rate = 6 * (RSSI + 84) + 52;
        round Estimated Rate to the closest MCS rate;
        report TPUT for Link-Orbi-2G = closest MCS rate;
    }
    If −90 < RSSI < −84, then
        report TPUT for Link-Orbi-2G = 19Mbps;
    If RSSI ≤ −85, then
        report TPUT for Link-Orbi-2G = 1Mbps;
}
If 26Mbps ≤ 2.4G Rate < 72Mbps {
    Estimated Rate = 1.72 * (2.4G Rate − 19) + 39;
    round up Estimated Rate to the closest 2.4G PHY rate;
    report TPUT for Link-Orbi-2G = Max(Estimated Rate, RSSI Estimated Rate);
}
<End>
<Start>
If 2.4G max of RSSI of antenna ≥ −50 {
    If 2.4G Rate < 70Mbps, then report TPUT for iPhone-6-5G = 351Mbps;
    If 2.4G Rate ≥ 70Mbps, then report TPUT for iPhone-6-5G = 433Mbps;
}
If RSSI < −50 and If 2.4G Rate ≥ 70Mbps, then
    report TPUT for iPhone-6-5G = 175Mbps;
If −69 ≤ RSSI < −50 {
    Estimated Rate = 13.84 * (RSSI + 69) + 88;
    round Estimated Rate to the closest 1x1 11ac PHY rate;
    report TPUT for iPhone-6-5G = the closest 1x1 11ac PHY rate;
}
If RSSI ≤ −69, then
    report TPUT for iPhone-6-5G = iPhone-6-2G (i.e., use the 2.4G averaged rate and map it to the closest 2.4G MCS rate);
}
<End>
```

The following is yet another example pseudo code for estimating the performance of the users device at 5 GHz using RSSI and PHY rates measured at the user's device at 2.4 GHz.

```
<Start>
If 2.4G max of RSSI of antenna ≥−50 {
    If 2.4G Rate < 70Mbps, then report TPUT for iPhone-6-5G = 351Mbps;
    If 2.4G Rate ≥ 70Mbps, then report TPUT for iPhone-6-5G = 433Mbps;
}
If RSSI < −50 and If 2.4G Rate ≥70 Mbps, then
    report TPUT for iPhone-6-5G = 175Mbps;
If −69 ≤ RSSI < −50 {
    Estimated Rate = 13.84 * (RSSI + 69) + 88;
    round Estimated Rate to the closest 1x1 11ac PHY rate;
    report TPUT for iPhone-6-5G = the closest 1x1 11ac PHY rate;
}
If RSSI ≤ −69, then
    report TPUT for iPhone-6-5G = iPhone-6-2G (i.e., use the 2.4G averaged rate and map it to the closest 2.4G MCS rate);
}
<End>
```

FIGS. 15A-15D are example tables of closest PHY rates that can be used for throughput estimation in the above pseudo codes.

FIG. 16 is an example table for mapping between estimated link rate (throughput) and user instruction, for a mesh point operating in a particular frequency band. Specifically, with the results from the above TPUT estimation techniques, the software application running on the user's device together with existing mesh points can provide automated guidance to the user with regard to the location of installing the additional mesh point. Shown in FIG. 16 is an example for guiding a user with Apple iPhone 6 for installing a mesh point that is to operate in the 5 GHz frequency band. The example table may be used to generate instructions in the user interfaces shown in FIGS. 7A-7E.

Figure 17B:
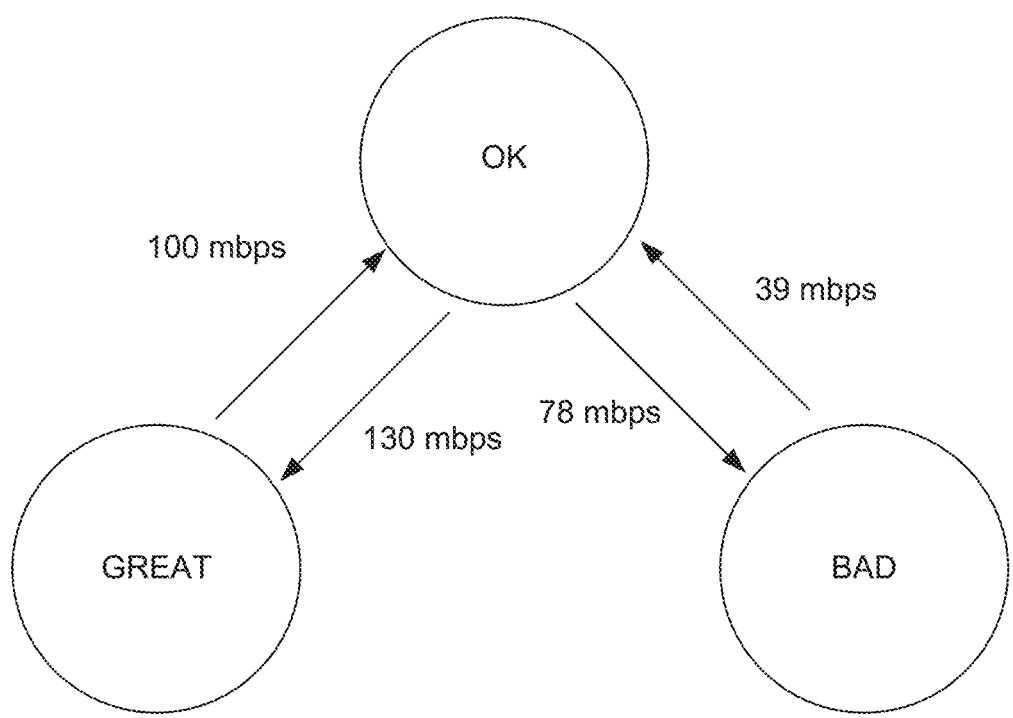
FIG. 17B is an alternative example that implements a hysteresis mechanism for mapping between estimated link rate and wireless network coverage.

FIG. 17A is an example table for mapping between estimated link rate (throughput) and wireless network coverage, and FIG. 17B is an alternative example that implements a hysteresis mechanism for mapping between estimated link rate and wireless network coverage. The tristate mechanism illustrated in FIG. 17B is merely an example, as more or fewer states may be used. Specifically, with the results from the above TPUT estimation techniques, the software application running on the user's device together with existing mesh points can also provide wireless network coverage survey to discover dead spots or to verify the mitigation thereof. The examples in FIGS. 17A-17B may be used to generate instructions in the user interfaces shown in FIGS. 5A-5D.

Roaming in a Wireless Mesh Network

Traditionally, wireless network clients (e.g., user devices 130a-130n) only start roaming when the measured RSSI value drops below a predetermined threshold. This mechanism can be ineffective in some scenarios, for example, when the link to the Internet is not functional, and yet the client does not roam to another nearby access point that has a functional link. In addition, the RSSI value of access point measured by the client is not a good estimation of the quality of the wireless link as the link is typically asymmetric (e.g., because the transmission power of an access point is usually higher than the client's transmission power).

Figure 21:
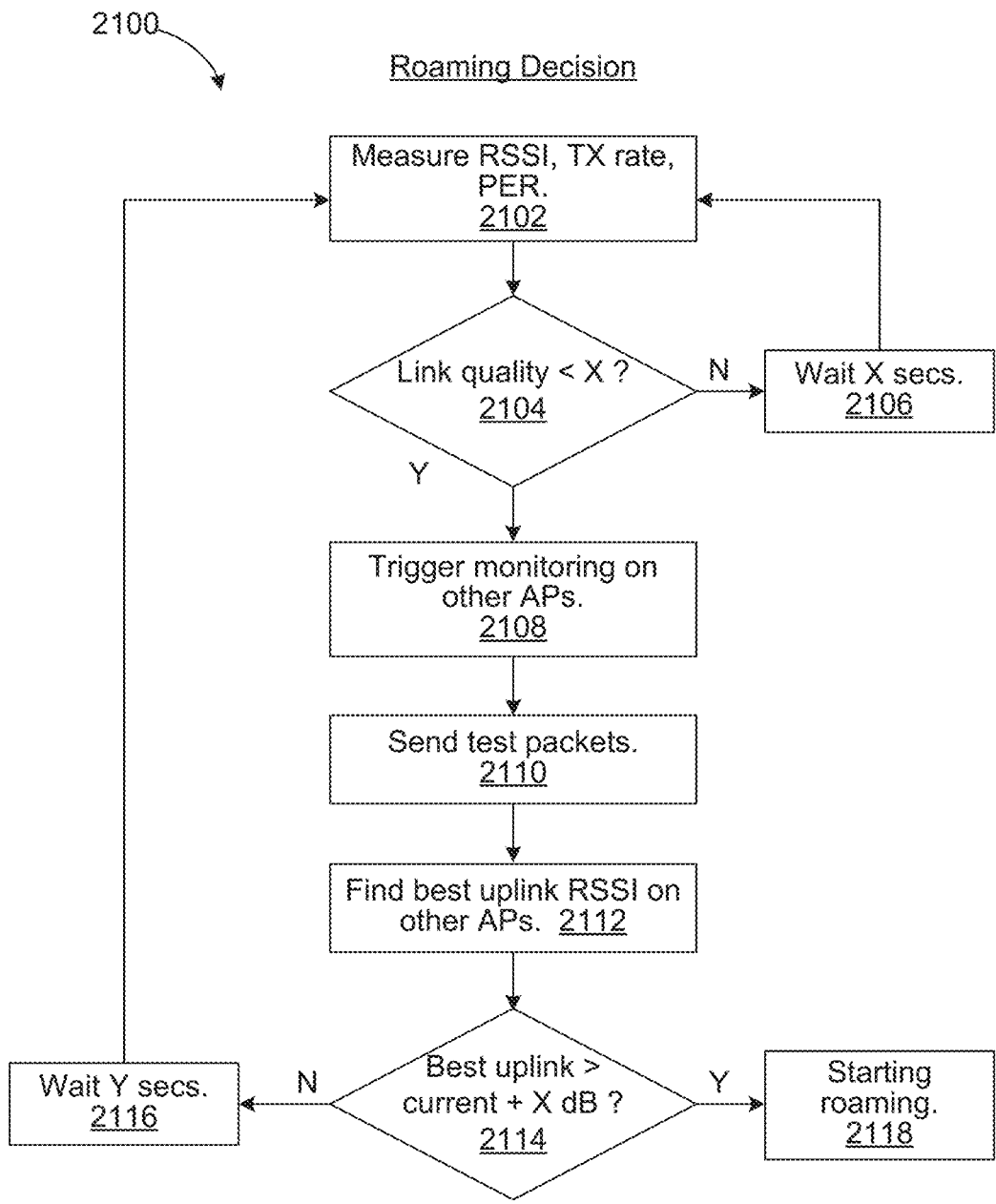
FIG. 21 is an example flow chart illustrating a method for performing roaming decision in a mesh network disclosed herein.

Accordingly, the disclosed wireless mesh network can measure one or more parameters in addition to the RSSI value to better determine when and how to roam a client. Some examples of the parameters include: the data rate being currently used, packet aggregate size, packet error rate (PER), retry count, available airtime, and delay on the link. With simultaneous reference to flow chart 2100 illustrated in FIG. 21, an example method for performing roaming decision in a mesh network are further discussed below. The method can be implemented and performed by a controlling entity of the mesh network in conjunction with the software application that runs on the user device (e.g., device 130*a*) and the mesh points. Depending on the embodiments, the controlling entity may be centralized (e.g., on the main mesh point 112*a*, FIG. 1A), distributed among the mesh points (e.g., on mesh points 112*a*-112*n*, FIG. 1A), and/or remotely controllable (e.g., via a remote server that is in the WAN IP Network 120).

Specifically, in one or more implementations, when a particular client is associated with a certain mesh point, other mesh points can also measure the RSSI value, TX data rate, and PER from the particular client (Step 2102). Depending on the embodiment, the decision flow for measuring these values can be performed in a simultaneous or a staggered fashion. For example, in some embodiments, the RSSI value, TX data rate, and PER can be measured together simultaneously to collectively determine wither to trigger the next step. In some other embodiments, one of the values (e.g., RSSI) can be first measured against a certain threshold, then another value is compared another threshold, and so forth, until all of the values are compared and together determine that the next step should be proceeded. In addition or as an alternative to comparing all the values, some implementation can compare only a select number of values or give weight to a certain value in determining whether to proceed to the next step.

A number of embodiments can determine when roaming is to take place based on information gathered from both the mesh point that the client is currently associated with and the mesh point(s) that the client is not currently associated with. Roaming of the particular client to another mesh point can take place, for example, when the existing link quality is deemed insufficient and it is estimated that there exist a better link for the client to connect (Step 2104). To avoid roaming too frequently and potentially wasting excessive resource on taking measurements, a timer mechanism can be implemented (Step 2106), such that only when a link quality problem persists then is the next step in the roaming mechanism triggered. The better link may be a different mesh point, or it may be a different band on same mesh point. Because it is observed that a single sample of RSSI value may not be an accurate measurement (e.g., because of multi-path fading), one or more embodiments are to average RSSI values over packets. Some embodiments can also detect the Modulation and Coding Scheme (MCS) of the packet to determine what offset value may have been used.

In some examples, similar to what is described above regarding link rate estimation, different mapping can be formulated from client statistics (e.g., RSSI value, PHY rate, etc.) on the frequency band of use in order to estimate what the anticipated RSSI would be on another frequency band to which client may connect, and/or on another mesh point to which the client may be able to connect. In certain embodiments, a mapping can be stored (e.g., at each mesh point) in the mesh network. The mapping can be used for mapping the data measured from the client to an estimated PHY link quality.

If the link quality problem persists, the mesh network starts to compile a list of potential roaming candidates by starting to monitor the quality of potential links from other mesh points (Step 2108). The list of candidate is calculated based on PHY parameters, such as data rate, RSSI value, etc., and the list can be used to determine the best candidate for roaming clients. For example, similar to the rate estimation techniques described above, test packets can be sent (Step 2110), and a potential link rate may be determined (e.g., by uplink RSSI and/or other parameters observed on other mesh points in proximity) (Step 2112). Depending on the embodiment, the list can be maintained by the controlling entity, which may be scattered among the mesh points (e.g., in a decentralized fashion) or can be centralized (e.g., in the main mesh point). Example of the parameters that may be taken into account for deciding the best roaming candidate include: a list of clients of each candidate already associated with and how much aggregate traffic is between each candidate and its clients; the type of traffic supported by the candidate (e.g., voice, video, data, etc.); the interference and noise level surrounding the candidate; and the type of traffic that the client who may roam uses.

If there is a suitable candidate (Step 2114), for example, when the potential link to the candidate is better than the current link by a certain degree (e.g., X dB), then the roaming takes place (Step 2118). Otherwise, another timer mechanism can be implemented (Step 2116) before the roaming decision flow chart can be run again, such that the system can avoid perform roaming at an unnecessarily high frequency. When roaming takes place, depending on the type of roaming method used, there may be a period of down time during which the WLAN connection is unavailable. Therefore, certain embodiments disclosed herein can measure and keep record of this period of down time, and take into account this roaming overhead in future roaming decision (e.g., for the particular client or for the particular type of client). In some examples, a table or a database that records a default roaming time for each type of commonly seen devices can be utilized. Additionally, depending on the time and type of roaming, the execution of a decision to roam a client can be delayed if the client has ongoing data traffic that is delay sensitive (e.g., if a minimum level of QoS is active for the type of data traffic). Moreover, if the roaming down time exceeds a certain threshold, the mesh network may choose to utilize a time during which the client is inactive for roaming.

The mesh network (e.g., the controlling entity thereof) can cause roaming of a client in several ways. If the client does not support intelligent roaming commands (e.g., those described in IEEE 802.11v and 802.11r), the mesh network can force the client to roam by disconnecting the client (e.g., with Deauthentication and/or Disassociation management frames). The mesh network may determine the client type and may provide a disconnect reason to the client. However, generally speaking, disconnecting a client is undesirable because after disconnection, it is uncertain whether the client would try to reconnect back to the network. In some embodiments, if the disconnected client attempts to connect back to the mesh point or the frequency band that the controlling entity determines to be less desirable, the controlling entity can cause the mesh network not respond to the association request. Additionally or alternatively, the controlling entity may keep a timer for the client, such that in the case that the disconnected client keeps requesting to connect to an inferior mesh node or frequency band, the mesh network may eventually allow the client to connect after the timer expires, so as not to leave the client with no connection at all.

If the client supports intelligent roaming commands, then the mesh network can use roaming commands to enable pre-roaming client measurement, and can use such kind of commands to communication with the client to suggest the roaming. However, it is recognized in the present disclosure that the support of these intelligent roaming commands may be client implementation dependent and not universal, sometimes even when the client advertises the capability to support such commands. Therefore, the controlling mechanism disclosed herein can not only discover which clients have the capability for intelligent roaming commands (e.g., during the association process), but also learn over time which ones of these client devices are behaving as anticipated and which ones are not, so that the mesh network in performing roaming can adapt to a particular client's behavior.

More specifically, one or more embodiments of the mesh network can learn over time how different clients behave and can adjust its roaming instruction and behavior accordingly. Depending on the implementation, this historical data can be maintained based on the client's MAC address, association identifier (AID), or any other unique identifier. The decision regarding when to roam a particular client may depend on the client's observed behavior. For example, if the client in the past has a history of not following the anticipated roaming behavior responsive to a roaming command, then the mesh network can decide to only roam the particular client when there is a substantial performance drop (e.g., below a more significant threshold than a regular, roaming-friendly client) and similarly, in some embodiments, the mesh network can choose not to roam the particular client even if the client can receive a better WLAN link performance with another mesh point or another band on same mesh point. Similar to described above, roaming decision may depend on the traffic type or the dominant traffic type of a specific client. Additionally or alternatively, roaming decision may depend on the roaming delay that a particular client has in moving from one mesh point to another mesh point, or from one frequency band to another frequency band on same mesh point. The mesh network is able to learn over time which roaming mechanism (e.g., IEEE 802.11v/k/r behaviors) works the best for each client based on how the client has roamed earlier. In addition to mitigating the aforementioned disconnection issue, the benefit of intelligent roaming includes, for example, faster channel scanning, higher efficiency in WLAN "air time" (since fewer probe requests and probe responses are needed, there is more bandwidth for the rest of the network; and reduced client power consumption (since fewer active scans are needed).

In a number of implementations, the mesh network's roaming commands support the BSS Transition Management (BTM) for network assisted roaming, described in IEEE 802.11v standards for wireless network management. In general, BTM allows steering the client seamlessly even when there is ongoing traffic. One or more embodiments of the mesh network can use the following packets for roaming: BSS Transition Management Request (AP to client); BSS Transition Management Response (Client to AP); and BSS Transition Management Query (Client to AP). Specifically, the BSS Transition Management Request can be used when the AP (e.g., a mesh point) offers advice to the client. This can include a list of the APs (e.g., other mesh points) to which the client can consider associate (e.g., "Neighbor Report" information). The BSS Transition Management Response can be used for the client to accept or reject, and the client can also include a reason code for the acceptance or rejection.

The mesh network can also perform WLAN radio measurements, as described in IEEE 802.11k standards. Functions include the generation and dissemination of a Link Measurement report (i.e., for a client or an AP to query the other side for the quality of the link), as well as a Neighbor Report (i.e., information about neighboring APs that are known candidates to which the client can consider roaming). Other IEEE 802.11k measurements supported include, for example, Beacon, Channel Load, Noise Histogram, STA Statistics, Location Configuration Information, Transmit Stream/Category Measurement, and Frame.

The mesh network can also perform fast BSS transition, as described in IEEE 802.11r standards. Without IEEE 802.11r, a mobile device client may need to go through reauthentication after reassociating. With IEEE 802.11r, the mesh network can reestablish existing security and/or QoS parameters prior to reassociating a client to a new mesh point. This technique is especially useful for real time interactive services (e.g., voice and video communications). This can also reduce the time that connectivity is interrupted between a mobile client and WLAN infrastructure when that mobile client is connecting to a new mesh point. Reauthentication time are also saved, which is especially prominent in a strongly secure WLAN (e.g., in an enterprise environment where 802.1x and EAP methods for authentication are used).

With the above introduced roaming techniques in mind, the following are pseudo codes for roaming decisions. Similarly, these pseudo codes should be customized for a specific application. For example, in one or more embodiments, these pseudo codes may have different parameters for a different combination of a specific network technology (e.g., IEEE 802.11n, 802.11ac) and antenna configuration (e.g., 1×1, 2×2, 3×3). The following example are pseudo codes for a force roaming decision for a device (e.g., Apple iPhone 6) with an IEEE 802.11ac with a 1×1 antenna configuration, operating in 5 GHz frequency band. Note that a "force roaming" is where the mesh network actively sends instructions to the client or otherwise cause the client to roam (which, in some instances, may cause a connection loss).

```
<Start>
Force Roaming Decision {
If a client has not roamed recently (e.g., the past 60 seconds) {
    If one of the following happens:
        (If 5G max of RSSI of antenna ≤ −80) or
        (If PHY Rate < 58) or
        (If Path Rate < 10Mbps)
    start roaming;
    once roaming decision happens, send 20 ARP packets;
    If there are not 20 packets in the past three seconds, then
        average over all new packets in past three seconds;
    otherwise,
        average RSSI values on last 20 packets from monitor mode;
}
```

-continued

```
If a client has roamed recently {
    If one of the following happens:
        (If 5G max of RSSI of antenna ≤ −84) or
        (If PHY Rate < 10) or
        (If Path Rate < 2Mbps)
        start roaming;
    }
}
<End>
```

As shown in the above pseudo code, once a decision to roam a client has started, the RSSI values are observed by neighboring mesh points for candidate selection. Then, the following pseudo code can be used to estimate PHY rate based on the RSSI measured.

```
<Start>
If RSSI > −65, then
    report Path Rate Target = 351Mbps;
If −65 < RSSI < −80 {
    Estimated Rate = 10.29 * (RSSI + 80) + 117;
    report Path Rate Target = map Estimated Rate to the closet 80MHz
    rate;
}
If −80 < RSSI < −85, then
    report Path Rate Target = 58Mbps;
If RSSI < −80, then
    report Path Rate Target = 1Mbps;
<End>
<Start>
If RSSI_Original > −70 {
    If Path Rate original larger than 10, then
        roam if path rate target is larger than path_rate_original +30
        and
RSSI is larger than −75;
    If Path Rate original smaller than 10, then
        only roam if path rate target is larger than
        20+path_rate_original
and RSSI is larger than −80;
        otherwise,
            do not roam;
}
if −70 < RSSI_Original < −80 {
    If RSSI_Target > −80, then
        If Path_rate_target>Path_Rate_original+10, then
            roam;
    If RSSI_Target < −80 {
        If Path rate_original > 5Mbps, then
            do not roam;
        If Path rate_original < 5Mbps {
            If RSSI_Target<−85, then
                do not roam; else,
                roam if Path rate target is larger than 10+path rate
original;
        }
    }
}
If RSSI_Original < −80 {
    If RSSI Target > −75, then
        roam to the target with highest path rate, if destination path rate
is higher than 5Mbps;
    If −75 > RSSI Target > −80, then
        roam to the target with highest path rate, if destination path rate
is higher than 10Mbps;
    If −85< RSSI Target <− 80, then
        roam to the target with highest path rate, if destination path rate
is higher than 20+current_path_rate;
    If RSSI Target < −85, then
        do not roam;
}
<End>
```

Similarly, continuing with the example device, IEEE 802.11ac with a 1×1 antenna configuration, operating in 5 GHz frequency band, the following example are pseudo codes for a soft force roaming decision for the same device.

Note that a "soft roaming" is where the mesh network passively opens a roaming window to the client that allows the client to use available information to roam to a stronger access point.

```
<Start>
Soft Roaming Decision {
If a client has not roamed recently (e.g., the past 60 seconds) {
    If one of the following happens:
        (If 5G max of RSSI of antenna ≤ −75) or
        (If PHY Rate < 117) or
        (If Path Rate < 20Mbps)
        start checking on opening up;
        once opening up decision happens, send 20 ARP packets;
        // In some embodiments, a limitation is placed on the frequency
        of
        // this taking place (e.g., can be only once every 60 seconds)
        // Further, if a roaming window is open and the client does not
        // send a probe request, this time can be increased from 60 to
        // 180, and can be kept at 180 until the client sends a probe
        // request or any other request if with this condition is triggered.
    If there are not 20 packets in the past three seconds, then
        average over all new packets in past three seconds;
    otherwise,
        average RSSI values on last 20 packets from monitor mode;
}
<End>
```

The pseudo code for decision on opening up the roaming window is provided herein as follows.

```
<Start>
If RSSI_Original > −70 {
    If Path Rate original larger than 20, then
        open up roaming window if path rate target is larger than
path_rate_original +20 and RSSI is larger than −75;
    If Path Rate original smaller than 20, then
        open up roaming window to the best path rate if the best path
rate is higher than max(10+current path rate, 20);
    otherwise,
        do not open up roaming window;
}
if −75 < RSSI_Original < −80 {
    If RSSI_Target > −75, then
        If Path_rate_target > 20, then
            open up roaming window;
        If −75 > RSSI_Target > −80, then
            If Path_rate_target > Path_Rate_original+10, then
                open up roaming window;
        If RSSI_Target < −80 {
            If Path rate_original > 5Mbps, then
                do not open up roaming window;
            If Path rate_original < 5Mbps {
                If RSSI_Target<−85, then
                    do not open up roaming window;
                otherwise,
                    open up roaming window;
            }
        }
    }
}
If RSSI_Original < −80 {
    If RSSI Target > −80, then
        open up roaming window if destination path rate is higher than
10Mbps;
    If RSSI Target < −80, then
        do not open up roaming window;
}
<End>
```

FIGS. 18A-18B are a list of known user devices with their capabilities to follow or otherwise coordinate with the mesh network in performing intelligent roaming. As shown in FIG. 18A, all newer iOS devices are advertised to support all three 802.11k, 802.11r, and 802.11v Wi-Fi network standards. As shown in FIG. 18B, some later version of Android devices do support intelligent roaming, but some older version devices may only support 802.11r and 802.11k, but not BTM. Different capabilities of the devices should be factored in when adjusting the parameters in the pseudo codes.

Dedicated Backhaul Link and Fault Tolerance

Figure 19:
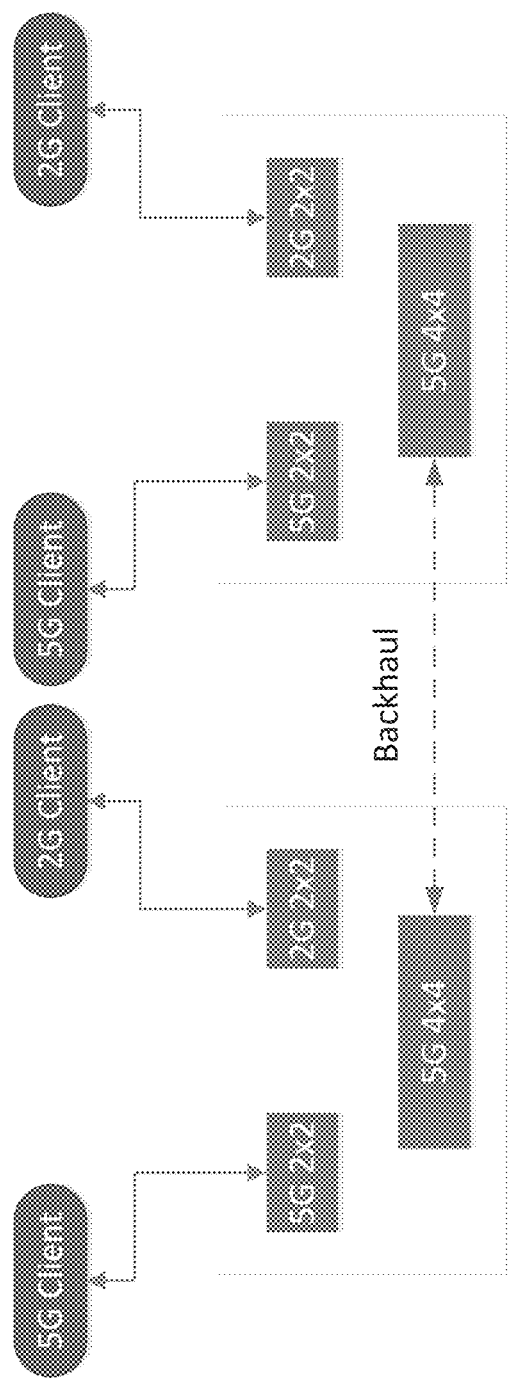
FIG. 19 illustrate an example diagram showing a backhaul link established between two mesh points (e.g., in the mesh network).
Figure 22A:
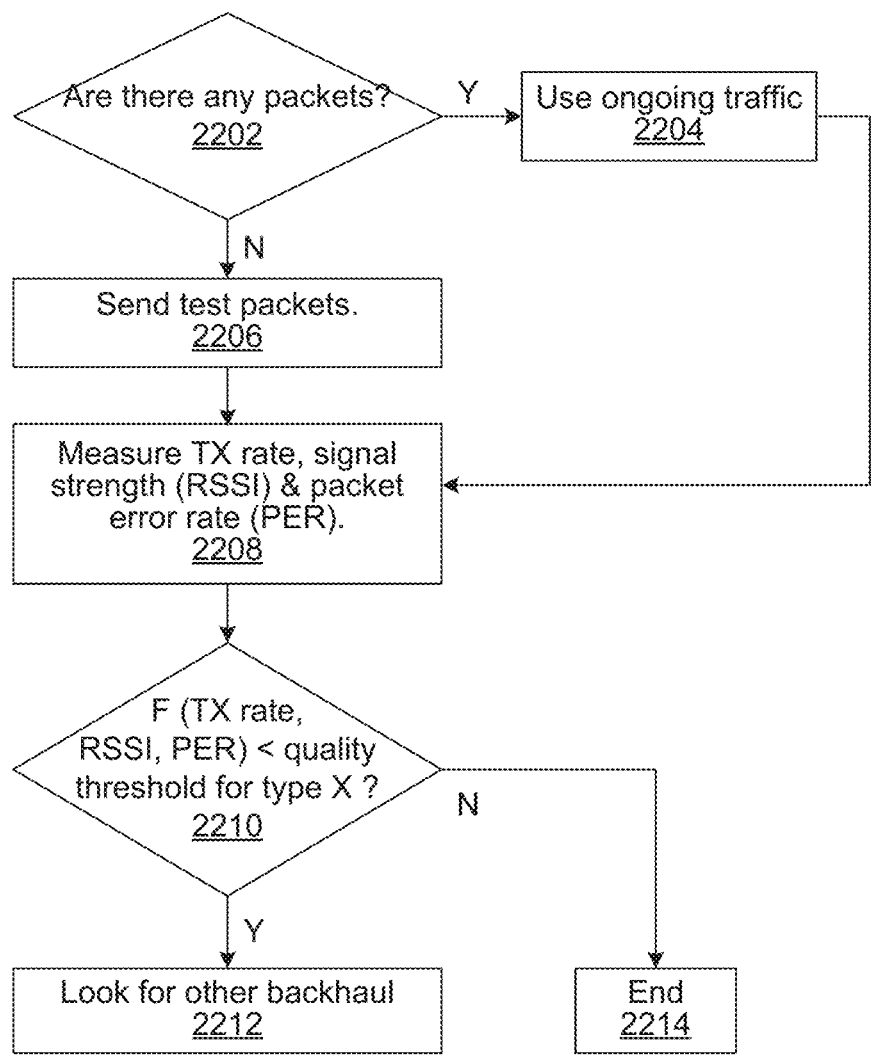
FIGS. 22A-22C are example flow charts illustrating methods for performing switching and selection of dedicated backhaul in a mesh network disclosed herein.
Figure 22B:
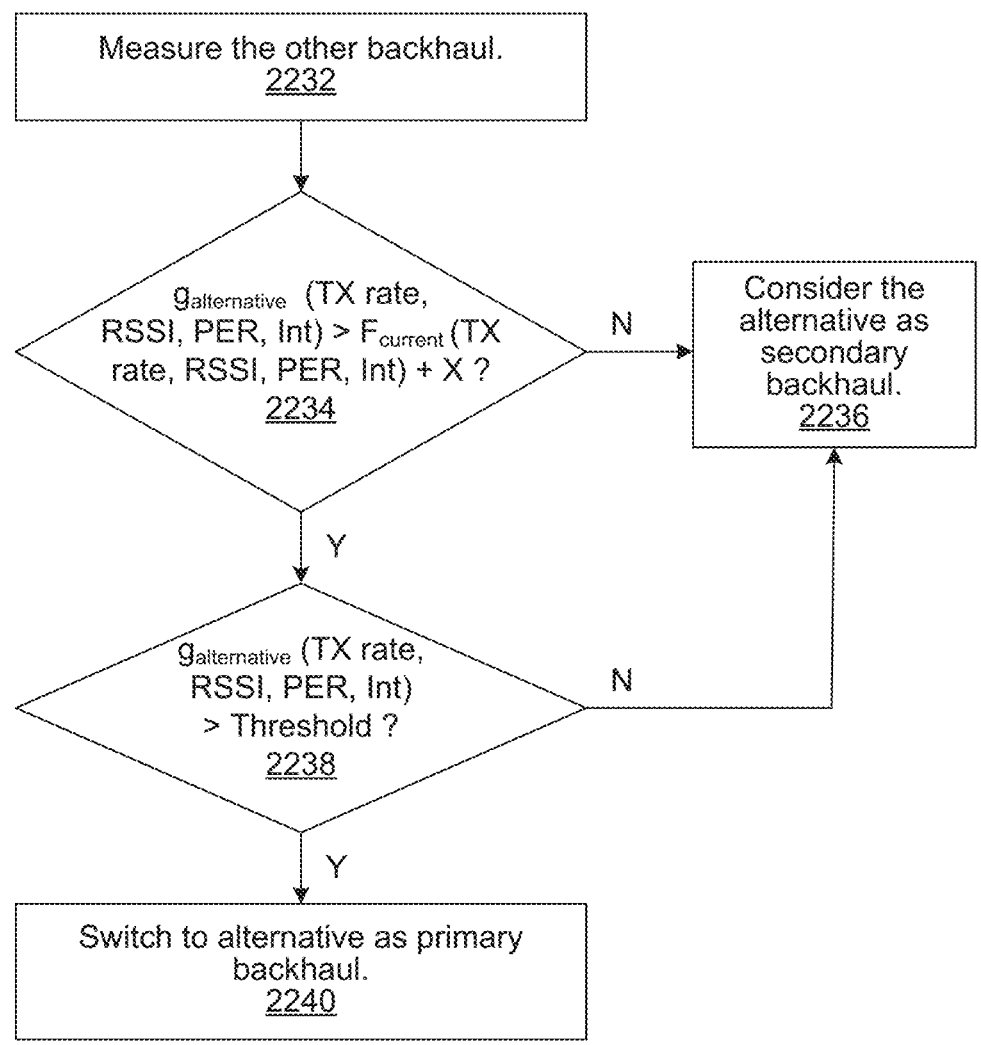
Figure 22C:
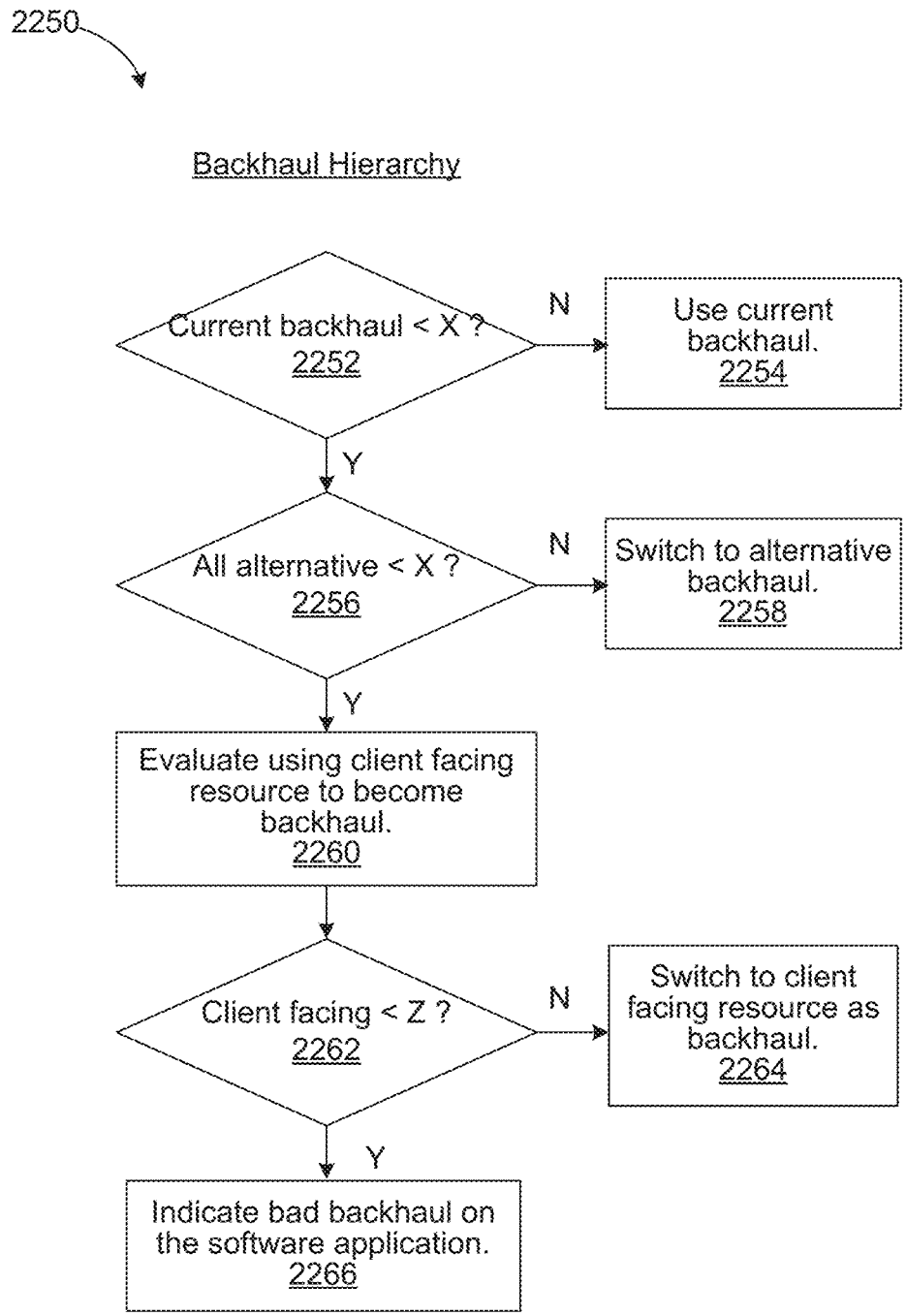

FIG. 19 illustrate an example diagram showing a backhaul link established between two mesh points (e.g., in the mesh network). Besides regular WLAN services (e.g., data packet forwarding to and from the gateway and the Internet) that are provided by the mesh network to client devices, in a number of implementations, the mesh points themselves in the mesh network can utilize one or more telecommunication circuits to form one or more dedicated backhaul links among the mesh points. In some examples, such backhaul links may be used to perform control and management functions, for example, the controlling entity to instruct a mesh point to execute a roaming decision for a client. In addition or as an alternative, such backhaul links can be utilized to provide more throughput, and/or to provide fault tolerance to the mesh network (e.g., to provide redundancy against temporary interference, etc.). With simultaneous reference to flow charts 2200, 2230, and 2250 illustrated in FIGS. 22A-22C, example methods for performing switching and selection of dedicated backhaul in a mesh network are further discussed below. These methods can be implemented and performed by a controlling entity of the mesh network in conjunction with the software application that runs on the user device (e.g., device 130a) and the mesh points. Depending on the embodiments, the controlling entity may be centralized (e.g., on the main mesh point 112a, FIG. 1A), distributed among the mesh points (e.g., on mesh points 112a-112n, FIG. 1A), and/or remotely controllable (e.g., via a remote server that is in the WAN IP Network 120).

More specifically, in some embodiments, the mesh points may be equipped with one or more of: a powerline communication circuit (e.g., HomePlug™ 1.0, AV, or AV2 compliant), a dedicated 5 GHz radio circuit, and/or a sub-1 GHz radio circuit, for purposes of establishing the dedicated backhaul link. Moreover, some embodiments provide the capability to combine the general purpose 2.4 GHz and 5 GHz WLAN radios with dedicated backhaul circuits to form different parts of the mesh network. For example, two mesh points may be connected using powerline while another two mesh points may be connected using the 2.4 GHz or 5 GHz WLAN radio. Fault tolerance mechanisms are built in to the system such that, for example, when the dedicated link is not functioning or when the performance of dedicated link is significantly below the 2.4 GHz or 5 GHz radio that device uses to communicate to client, the best communication link can be used as the backhaul link.

Link measurement techniques, which are described above, can be utilized here to measure or estimate the performance of the current dedicated backhaul link as well as other possible link options, to enable the selection of the best suitable backhaul link. Flow chart 2200 shows an example method for evaluating current backhaul to determine whether switching to an alternative backhaul is desirable. The method starts by monitoring and measuring the current backhaul. If there are already data packets in communication (Step 2202), then measurement can be performed on the existing data packets (Step 2204). If there is no or not enough active data communication, then, similar to the rate estimation techniques described above, test packets can be sent for the measurement of backhaul performance (Step 2206).

Then, the link speed of the backhaul can be measured by using, for example, the aforementioned rate estimation techniques. For example, TX rate, RSSI, and PER can be measured to perform rate estimation on the current backhaul (Step 2208). Thereafter, the estimated rate is compared to a quality threshold specific for the type of the backhaul that is currently used (Step 2210). Similar to what has been described above, the function for rate estimation for the backhaul and the quality threshold may vary based on the type of the backhaul (e.g., Powerline, sub-1G, and/or 5G), If the estimated rate in the current backhaul is below a quality threshold expected in the type of the backhaul, then the specific mesh point starts to seek for a better backhaul (Step 2212). If the estimated rate is acceptable (e.g., above the quality threshold), then at least temporarily there is no need to switch the backhaul (Step 2214). The method can be executed from time to time, for example, every 60 minutes, can be triggered by events such as a predetermined number of losses in mesh network specific controlling packets sent via the backhaul within a certain period, or can be triggered by any other suitable mechanism.

Flow chart 2230 is an example method for finding an alternative backhaul. When the mesh point determines that an alternative backhaul is desirable, it starts to measure and evaluate other backhaul channels (Step 2232). Similar to the method illustrated in flow chart 2200, TX rate, RSSI and PER numbers can be measured on the alternative backhaul (Step 2232). Additionally, the Internet speed or a target transmission rate (discussed above) can be taken into consideration. If the estimated rate of an alternative backhaul is not larger than the current backhaul by a certain amount (Step 2234), then the alternative is only considered as a secondary backhaul (Step 2236) (e.g., because the benefit of switching is fairly limited). However, if the estimated rate of an alternative backhaul is larger than the current backhaul by a certain amount (Step 2234), then an absolute value is compared to the estimated rate of the alternative backhaul (Step 2238). Again, if the estimated rate of the alternative backhaul is not larger than an absolute amount, the alternative is only considered as a secondary backhaul (Step 2236). If the estimated rate of the alternative backhaul passes the two criteria described above, then the current backhaul can be switched to this alternative backhaul (Step 2240).

In one or more embodiments, link speeds between different mesh points as well as several other parameters can also be used to determine the best mesh topology. These parameters can include: the number of clients that are connected to each mesh point and the amount of traffic they have; the communication frequency band that is used by the clients and such frequency's potential effect on the backhaul channel; external network interference and noise on the backhaul channel; delay and jitter requirements for the traffic type that each client is supporting; the coexistence of backhaul channel(s) with the Internet service; and the coexistence of backhaul channel with clients.

As mentioned, in some cases, a combination of different backhauls may be used between two mesh points. As such, certain embodiments provide that the backhaul link may be aggregated on the MAC or the transport layer. In addition, different backhauls may be used for different clients. More specifically, the dedicated backhaul technique introduced herein can be aggregated with other available communication links. Example aggregation may include, but not limited to: powerline and 2.4G; powerline and 5G; powerline, 2.4 and 5G; Sub1G and 2.4G; Sub1G and 5G; Sub1G, 2.4G and 5G; dedicated backhaul 5 GHz and general purpose 2.4 GHz; dedicated backhaul 5 GHz and general purpose 5 GHz; dedicated backhaul 5 GHz, general purpose 2.4 GHz and general purpose 5 GHz; and so forth. In variations, routing can be used for link aggregation purposes. For example, different communication links may be of different subnet/Virtual LAN (VLAN), but can either use static routing or dynamic routing to aggregate over different bridge links. In some embodiments that implement dynamic routing, known routing strategies such as equal-cost routing can be used; alternatively, a proper ratio of cost may be assigned over each bridge link.

Further, embodiments disclosed here can utilize Layer 2 aggregation when possible for backhaul links. In some examples, a spanning tree protocol (STP) can be used to avoid loops in the redundant paths in the network. The STP priority may be used to give priority depending on channel condition, traffic, and QoS parameters. The Rapid Spanning Tree Protocol (which is described in the IEEE 802.1w standards) can also be used. Other example link aggregation mechanisms that can be used in the mesh network backhaul links include: Multi Path TCP (when TCP aggregation is possible); IEEE 802.3ad Link Aggregation Control Protocol (LACP), and Port Aggregation Protocol (PAgP).

Note that, for the embodiments that utilize powerline communication as dedicated backhaul, the TPUT of the backhaul as well as the Internet's condition need to be more closely monitored, since a lot of interference issues may occur in such powerline communication, and in some instances, such communication may even interfere with home digital subscriber line (DSL) Internet connection (e.g., as a result of the phone and electric cables being too closely located in the environment). If using powerline communication has an observable adverse effect on DSL or other Internet connection, the duty cycle of the powerline can be limited, or in some implementations, powerline communication may be avoided in the entirety.

Various frequency band in sub-1 GHz may be also be used for backhaul links in the mesh network to extend the range. Examples include 902-928 MHz in the United States, and 433.05-434.79 MHz and 863-870 MHz in Europe. In some embodiments, IEEE 802.11ah can be used for sub-1G communications. Additionally or alternatively, IEEE 802.15.4 can be used. In yet another alternative, it is possible to convert an existing IEEE 802.11ac/n/g/a chipset to operate in a sub-1G frequency band. In certain cases, if the sub-1G frequency band is not available in a country or if there is too much interference or noise in the sub-1G band, the fault tolerant mechanism can fall back to 2.4G/5G, powerline or other available backhaul links.

In some implementations, a dedicated 5 GHz radio is used as the dedicated backhaul. Specifically, 5 GHz ISM band is a relatively wide frequency band and, as a result, with proper hardware and software design, it is possible to place more than one radio in 5 GHz in a single device without creating unacceptably large interference. One of such example is shown in FIG. 19. In such cases, a part of 5 GHz frequency band can be dedicated for backhaul purposes. Nonetheless, the mesh network can still monitor the noise and interference in the frequency band by checking the link statistics, and switch off to other available back-up channels when proper.

Note that, in selecting the backhaul, a general hierarchy may be observed to avoid disruption. Moreover, generally speaking, it is preferable to not use general purpose wireless communication resources (i.e., that are used for servicing data traffic from and to the clients) for backhaul purposes. Flow chart 2250 is an example method for implementing a backhaul selection hierarchy. In the illustrated example, first, only if the current backhaul is underperforming (e.g., drops below a certain threshold) (Step 2252) then is an alternative backhaul considered. Otherwise, the mesh point may continue to use the current backhaul (Step 2254). If the alternative backhaul is better than the threshold, then the alternative backhaul can be used (Step 2258). On the other hand, only if all alternative backhauls are also underperforming then is the general purpose wireless resource (i.e., client facing resource) considered. If the client facing resource can provide a rate that is more than a second threshold (Step 2262), then the mesh point can utilize a select portion of the client facing resource as the backhaul. Note that the second threshold may be different from the first threshold. In one example, since the client facing resource then would be serving both front end and back end traffic, the second threshold is higher than the first threshold. If the client facing resource cannot satisfy the second threshold, then the mesh point can indicate (e.g., on the software application) that it has a bad backhaul (Step 2266).

With the techniques introduced herein, including automated mesh point survey and guided installation for assisting the installation and configuration of a wireless mesh network, link rate estimation, roaming, and dedicated backhaul link implementation in such wireless mesh network, the present disclosure provides an integral solution where multiple wireless local area network (WLAN) mesh point devices are deployed in a relatively large environment with potential dead spots, such as a home or an office.

CONCLUSION

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium can include recordable/non-recordable media (e.g., read-only memory (ROM), random access memory (RAM), magnetic disk storage media, optical storage media, flash memory devices, etc.).

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims.

Accordingly, the specification and drawings are to be regarded in an illustrative sense rather than a restrictive sense.

What is claimed is:

1. A computer-implemented method for implementing a dedicated backhaul in a wireless mesh network formed with one or more mesh points, the method being performed by a first mesh point and comprising:
    establishing a forward wireless communication with a second mesh point;
    establishing a backhaul communication, separate from the forward wireless communication, with the second mesh point,
    wherein the forward wireless communication is established using a wireless communication technology using frequency bands selected from the group consisting of: a 2.4 GHz band, and a 5 GHz band, and
    wherein the backhaul communication is established using a communication technology selected from the group consisting of: a power line based communication, a 2.4 GHz or 5 GHz radio frequency (RF) technology using a dedicated radio, and a sub-1GHz RF technology; and
    constructing a list of backhaul candidates, each backhaul candidate having a score indicative of an estimated quality of a potential link between the first mesh point and the second mesh point;
    upon determining that a quality of service of the dedicated backhaul has dropped to below a predetermined threshold, establishing an alternative backhaul communication with the second mesh point using a backhaul candidate with the highest score on the list.

2. The method of claim 1, wherein the backhaul communication is dedicated for controlling packets.

3. The method of claim 1, further comprising: upon determining that a quality of service of the backhaul communication has dropped to below a predetermined threshold, redirecting backhaul traffic to the forward wireless communication.

4. The method of claim 1, further comprising: upon determining whether a quality of service of the dedicated backhaul has dropped to below a predetermined threshold, establishing an alternative backhaul communication with the second mesh point; and redirecting backhaul traffic to the alternative backhaul communication.

5. The method of claim 4, wherein the alternative backhaul communication is a direct link that links to the second mesh point through no other mesh point.

6. The method of claim 4, wherein the alternative backhaul communication is an indirect direct link that links to the second mesh point through another mesh point.

7. The method of claim 1, wherein different backhauls are used for different clients.

8. The method of claim 1, further comprising: measuring a plurality of qualitative parameters for the established backhaul communication; and causing the measured qualitative parameters to be transmitted to a controlling entity to facilitate a selection of a communication technology used for a backhaul communication between each two mesh points in the wireless mesh network.

9. The method of claim 1, further comprising: aggregating a plurality of backhaul links available on different communication technologies to create an aggregated backhaul communication.

10. The method of claim 9, wherein the aggregated backhaul links are aggregated on a media access control (MAC) layer or a transport layer.

11. A computing device comprising: one or more processors, that implements a mesh point in a wireless mesh network formed with a plurality of mesh points, the computing device being configured to perform a method comprising:
    establishing a forward wireless communication with a second mesh point;
    establishing a backhaul communication, separate from the forward wireless communication, with the second mesh point,
    wherein the forward wireless communication is established using a wireless communication technology using frequency bands selected from the group consisting of: a 2.4 GHz band, and a 5 GHz band, and
    wherein the backhaul communication is established using a communication technology selected from the group consisting of: a power line based communication, a 2.4 GHz or 5 GHz radio frequency (RF) technology using a dedicated radio, and a sub-1GHz RF technology; and
    constructing a list of backhaul candidates, each backhaul candidate having a score indicative of an estimated quality of a potential link between the first mesh point and the second mesh point;
    upon determining that a quality of service of the established backhaul has dropped to below a predetermined threshold, establishing an alternative backhaul communication with the second mesh point using a backhaul candidate with the highest score on the list.

12. The device of claim 11, wherein the backhaul communication is dedicated for controlling packets.

13. The device of claim 11, the method performed by the device further comprising: upon determining that a quality of service of the backhaul communication has dropped to below a predetermined threshold, redirecting backhaul traffic to the forward wireless communication.

14. The device of claim 11, the method performed by the device further comprising: upon determining whether a quality of service of the established backhaul has dropped to below a predetermined threshold, establishing an alternative backhaul communication with the second mesh point; and redirecting backhaul traffic to the alternative backhaul communication.

15. The device of claim 14, wherein the alternative backhaul communication is a direct link that links to the second mesh point through no other mesh point.

16. The device of claim 14, wherein the alternative backhaul communication is an indirect direct link that links to the second mesh point through another mesh point.

17. The device of claim 11, the method performed by the device further comprising: measuring a plurality of qualitative parameters for the established backhaul communication; and causing the measured qualitative parameters to be transmitted to a controlling entity to facilitate a selection of a communication technology used for a backhaul communication between each two mesh points in the wireless mesh network.

18. The device of claim 11, the method performed by the device further comprising: aggregating a plurality of backhaul links available on different communication technologies to create an aggregated backhaul communication.

19. The device of claim 11, wherein the aggregated backhaul links are aggregated on a media access control (MAC) layer or a transport layer.

* * * * *